(12) United States Patent
Clearman

(10) Patent No.: US 9,423,673 B2
(45) Date of Patent: Aug. 23, 2016

(54) QUICK-RELEASE BALL-AND-SOCKET JOINT CAMERA MOUNT

(71) Applicant: GoPro, Inc., San Mateo, CA (US)

(72) Inventor: Christopher Aaron Clearman, Half Moon Bay, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/922,157

(22) Filed: Oct. 25, 2015

(65) Prior Publication Data

US 2016/0116828 A1 Apr. 28, 2016

Related U.S. Application Data

(63) Continuation-in-part of application No. 14/521,458, filed on Oct. 22, 2014.

(51) Int. Cl.
*G03B 17/00* (2006.01)
*G03B 17/56* (2006.01)

(52) U.S. Cl.
CPC .......... *G03B 17/561* (2013.01); *G03B 17/566* (2013.01)

(58) Field of Classification Search
USPC .......................................................... 396/428
See application file for complete search history.

(56) References Cited

U.S. PATENT DOCUMENTS

| 2,962,251 | A | * | 11/1960 | Karpf | F16M 11/06 248/183.2 |
| 8,014,656 | B2 | * | 9/2011 | Woodman | B63B 25/002 396/25 |
| 8,267,361 | B1 | * | 9/2012 | Dordick | F16M 11/14 248/178.1 |
| 2001/0017339 | A1 | | 8/2001 | Brotz et al. | |
| 2005/0122424 | A1 | | 6/2005 | Overstreet | |
| 2008/0267613 | A1 | * | 10/2008 | Darrow | F16M 11/04 396/428 |
| 2012/0070223 | A1 | | 3/2012 | Wimberley | |
| 2012/0288269 | A1 | * | 11/2012 | Jensen | F16M 11/14 396/428 |
| 2014/0099093 | A1 | | 4/2014 | Johnson et al. | |

FOREIGN PATENT DOCUMENTS

WO    WO 2005/098304 A1    10/2005

OTHER PUBLICATIONS

PCT International Search Report and Written Opinion for PCT/US15/45403, Nov. 19, 2015, 12 Pages.
Office Action for U.S. Appl. No. 14/521,458, Jul. 28, 2015, 12 Pages.
Office Action for U.S. Appl. No. 14/521,458, Feb. 25, 2016, 13 Pages.

\* cited by examiner

*Primary Examiner* — W B Perkey
*Assistant Examiner* — Dennis Hancock
(74) *Attorney, Agent, or Firm* — Fenwick & West LLP

(57) ABSTRACT

A camera mounting system has an upper mount component, a lower mount component, and a base mount component. The upper mount component secures the camera and has a ball protrusion that reciprocally couples with a socket of the lower mount component. The upper mount component can rotate 360 degrees relative to the lower mount, and can pivot 90 degrees or more relative to the lower mount component. The lower mount component couples with the base mount component in a plurality of orientations. This camera mounting system allows for a large range of motion for the camera relative to the mounting system.

20 Claims, 21 Drawing Sheets

QUICK-RELEASE BALL-AND-SOCKET JOINT CAMERA MOUNT

CROSS REFERENCE TO RELATED APPLICATIONS

This application is a continuation-in-part of U.S. application Ser. No. 14/521,458, filed Oct. 22, 2014, which is incorporated by reference in its entirety.

BACKGROUND

1. Technical Field

This disclosure relates to a camera mounting system, and more specifically, to a ball-and-socket joint camera mounting system.

2. Description of the Related Art

Digital cameras are increasingly used in outdoors and sports environments. In order to secure cameras to sports equipment (such as sports boards, helmets, vehicles, and the like), cameras can be coupled to mounts that are mounted on the sports equipment. Conventional mounting systems can be limited in the directions and orientations in which a camera can be configured, limiting the utility and flexibility of the camera, and potentially decreasing a user's satisfaction with the camera and mounting system.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure 10A:
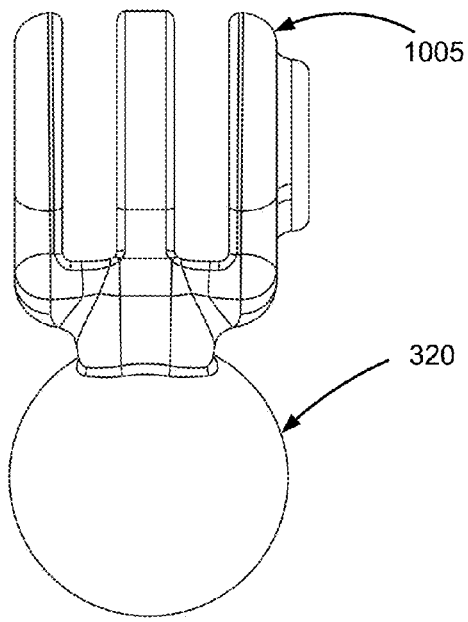
Figure 10B:
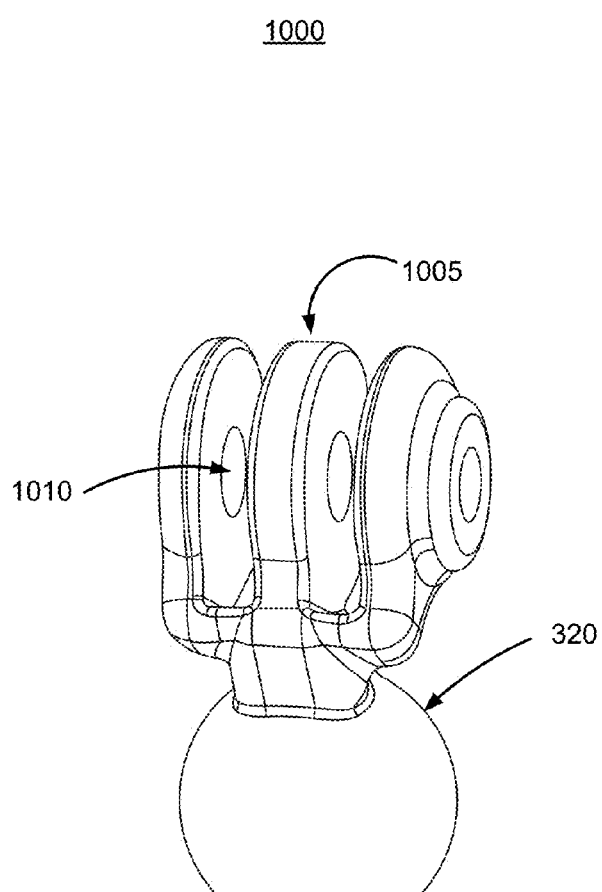
Figure 10C:
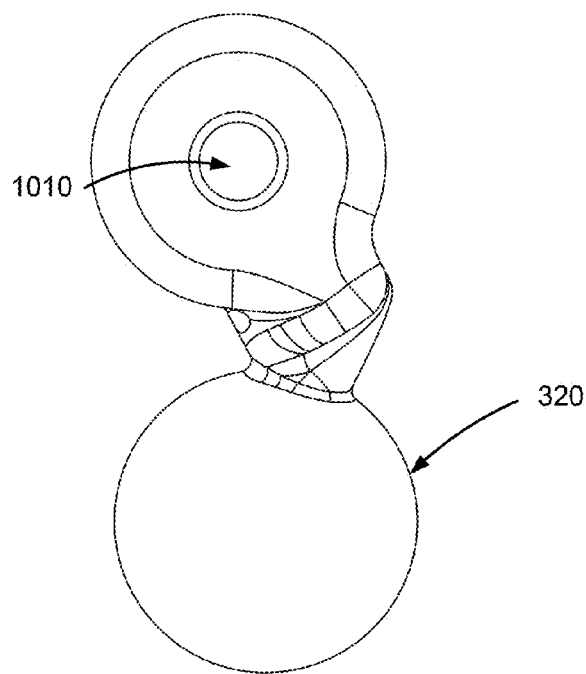

FIGS. 10a, 10b, and 10c illustrate views of an adapter for a camera mount with a ball-and-socket joint, according to one embodiment.

Figure 11:
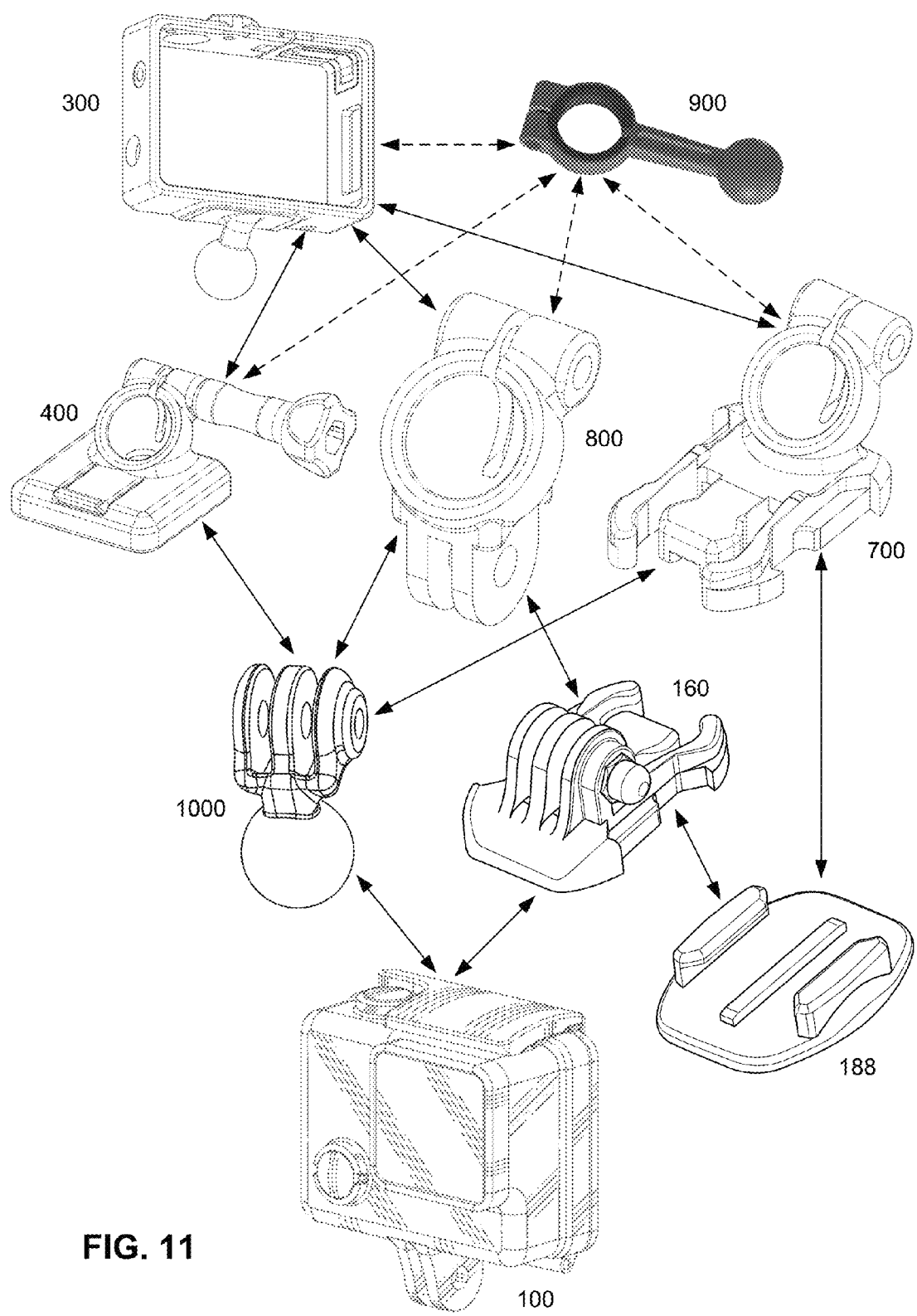

FIG. 11 illustrates a camera mount ecosystem, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system can include a camera and a camera housing structured to at least partially enclose the camera. The camera can include a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing can include a lens window structured on the front surface of the camera housing and configured to substantially align with the camera lens, and one or more indicator windows structured on the front surface of the camera housing and configured to substantially align with the camera indicators.

Figure 1A:
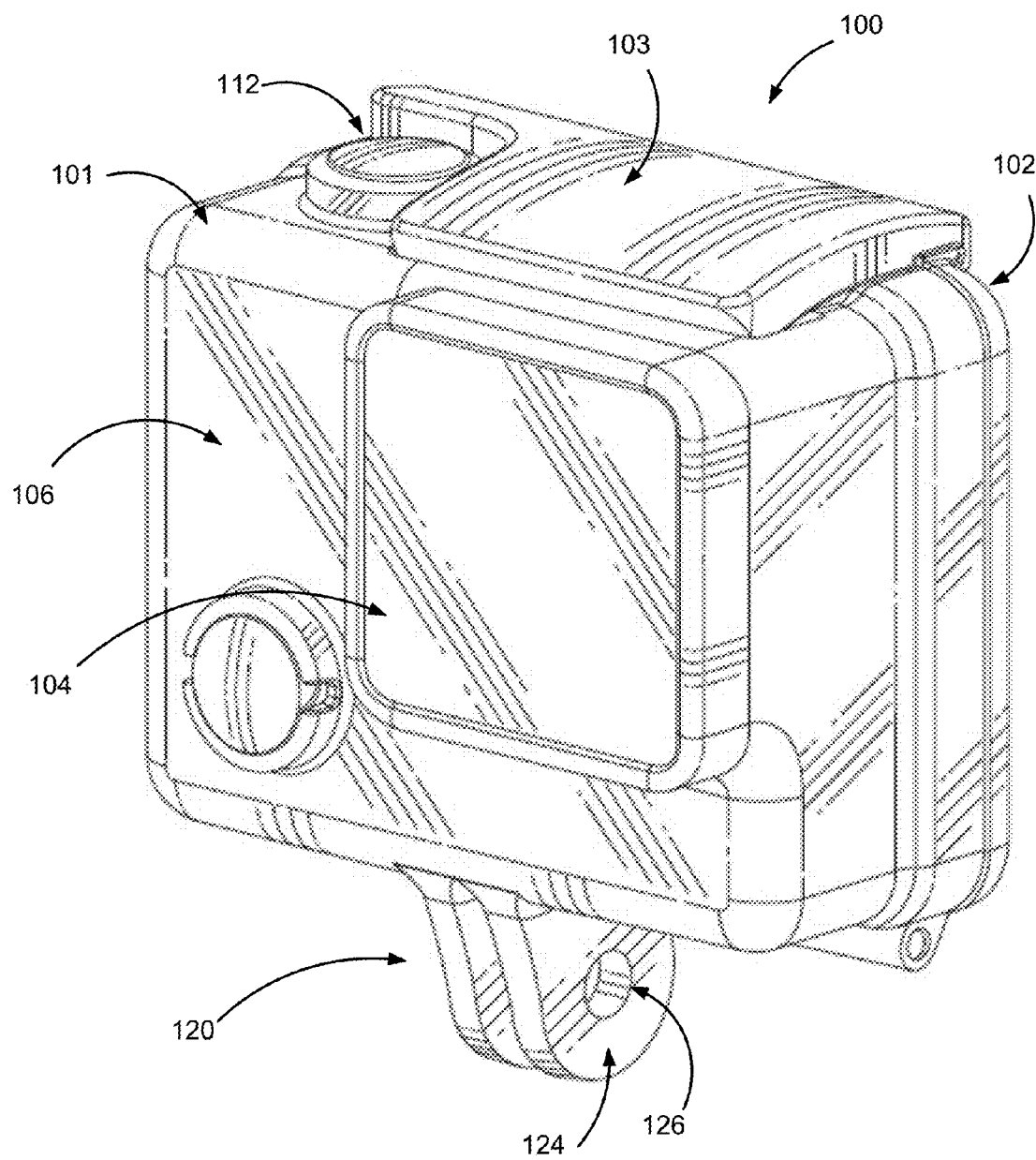
FIG. 1a illustrates a perspective view of a camera system, according to one embodiment.
Figure 1B:
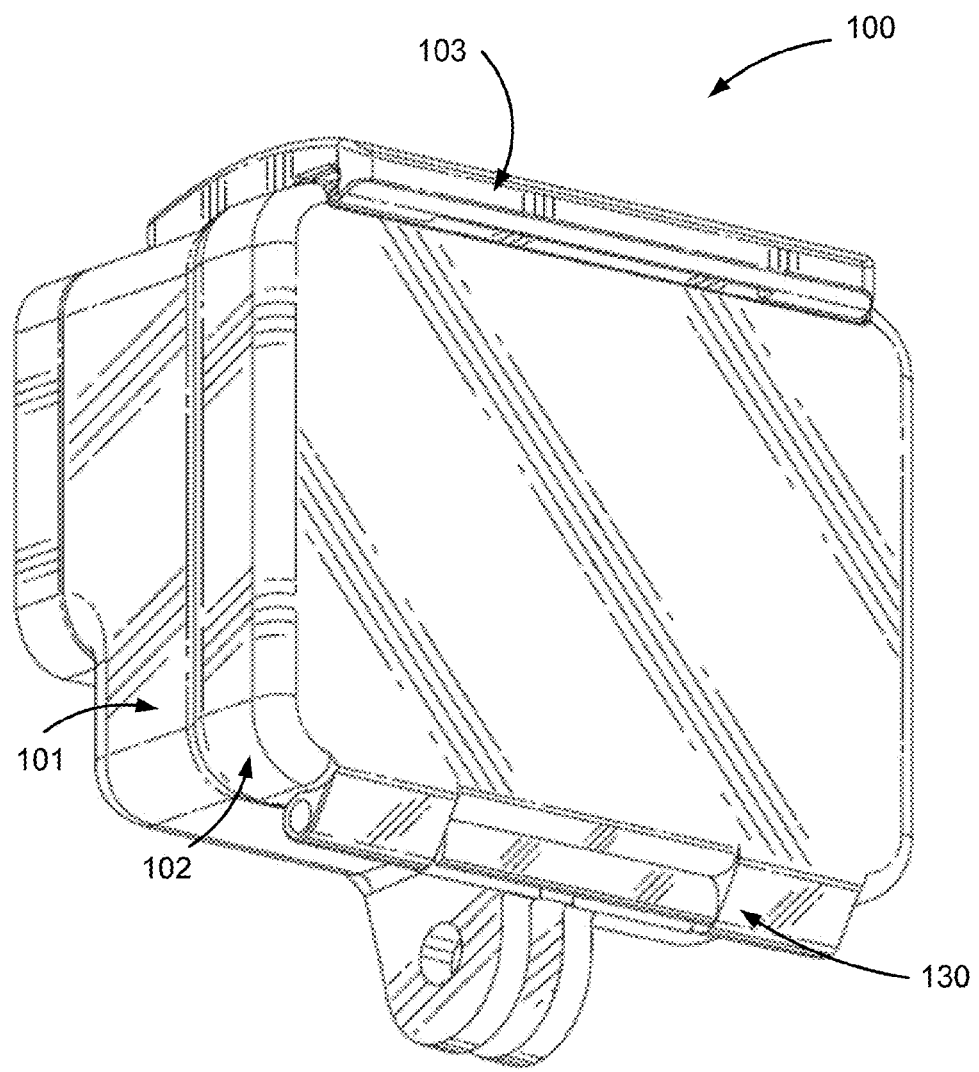
FIG. 1b illustrates a perspective view of a rear of the camera system, according to one embodiment.

FIGS. 1a and 1b illustrate various views of a camera system according to one example embodiment. The camera system includes, among other components, a camera housing 100. In one embodiment, a first housing portion 101 includes a front face with four sides (i.e., a top side, bottom side, left side, and right side) structured to form a cavity that receives a camera (e.g. a still camera or video camera), and a second housing portion 102 structured to couple to the first housing portion 101 and securely enclose a camera within the camera housing 100. The first housing portion 101 and second housing portion 102 can be pivotally coupled via a hinge mechanism (described in greater detail in FIG. 1b), and can securely couple via a latch mechanism 103. In some embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 4 to 6 centimeters, a width of approximately 5 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens.

In one embodiment, the camera housing 100 includes one or more securing structures 120 for securing the camera housing 100 to one of a variety of mounting devices such as a clip-style mount. In the embodiment of FIG. 1a, the camera housing 100 includes a plurality of protrusions 124, each including a hole 126 configured to receive a coupling mechanism, for instance, a turnable handscrew to pivotally couple the camera housing 100 to a mounting device including a plurality of reciprocal protrusions. In other embodiments, the camera housing 100 can be secured to a different type of mounting structure, and can be secured to a mounting structure via a different type of coupling mechanism.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

FIG. 1b is a rear perspective view of camera housing 100, according to one example embodiment. The second housing portion 102 detachably couples with the first housing portion 101 opposite the front face of the first housing portion 101. The first housing portion 101 and second housing portion 102 are collectively structured to enclose a camera within the cavity formed when the second housing portion 102 is securely coupled to the first housing portion 101 in a closed position.

In one embodiment, the second housing portion 102 pivots around a hinge mechanism 130, allowing the second housing portion 102 to be either in a closed position relative to the first housing portion 101 (for instance, when the second housing portion 102 is securely coupled to the first housing portion 101 via the latch mechanism 103), or in an open position (when the first housing portion 101 and the second housing portion 102 are not coupled via the latch mechanism 103). In the open position, a camera can be removed from or placed into the camera housing 100, and in the closed position, the camera can be securely enclosed within the camera housing 100. In one embodiment, the latch mechanism 103 includes a hook-shaped lateral bar configured to securely couple around a reciprocal structure of the second housing portion 102. In different embodiments, the latch mechanism 103 includes different fastening structures for securing the second housing portion 102 to the first housing portion 101, for example a button assembly, a buckle assembly, a clip assembly, a hook and loop assembly, a magnet assembly, a ball and catch assembly, and an adhesive assembly, or any other type of securing mechanism.

In one alternative embodiment, the hinge 130 is instead located on the top face of the housing 100, and the latch mechanism 103 is located on the bottom face of the housing 100. Alternatively, the hinge 130 and the latch mechanism 103 may be located on opposite side faces of the camera housing 100.

In one embodiment, the housing 100 includes a watertight seal so that the housing 100 is waterproof when the second housing portion 102 is in the closed position. For example, in one embodiment, the second housing portion 102 includes a sealing structure positioned on interior edges of the second housing portion 102. The sealing structure provides a watertight seal between the first housing portion 101 and the second housing portion when the latch mechanism securely couples the housing portions.

Figure 1C:
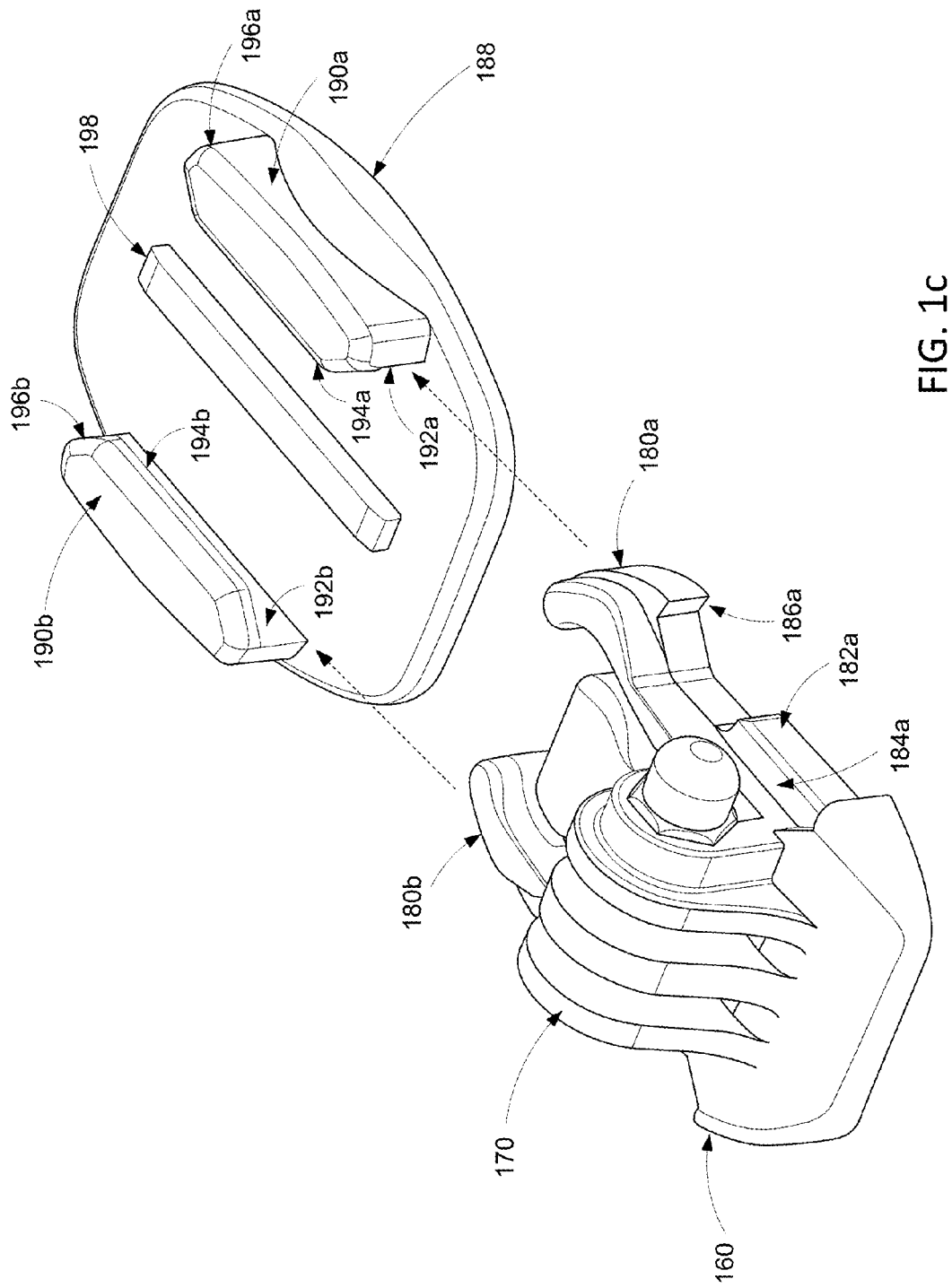
FIG. 1c illustrates a lower mount component and a base mount component for a camera system, according to one embodiment.

FIG. 1c illustrates a lower mount component and a base mount component, according to one embodiment. The lower mount component 160 includes a plurality of protrusions 170. In some embodiments, the plurality of protrusions 170 are configured to interlock with the plurality of protrusions 124 of the camera housing 100 of FIG. 1a such that the holes in each protrusion in the sets of protrusions align. When a screw or pin is inserted into the aligned holes, the camera housing 100 can be rotationally secured to the lower mount component 160.

The lower mount component 160 also includes two prongs 180a and 180b that can be flexibly compressed inward when squeezed. The prongs 180a and 180b include side securing surfaces 182a and 182b (not shown), top securing surfaces 184a and 184b, and securing lips 186a and 186b (not shown), respectively. The base mount component 188 includes securing arms 190a and 190b, each with side securing surfaces 192a and 192b, top securing surfaces 194a and 194b, and back securing surfaces 196a and 196b, respectively. The base mount component additionally includes spine 198.

When the prongs 180a and 180b of the lower mount component 160 are squeezed together, the width of the prong-side of the lower mount component is reduced to less than the width between the securing arms 190a and 190b, such that the lower mount component can be slid onto the base mount component 188. When the lower mount component is slid onto the base mount component 188, the side securing surfaces 182a and 182b make contact with and slide along the side securing surfaces 192a and 192b, respectively. Similarly, the top securing surfaces 184a and 184b make contact with and slide along the top securing surfaces 194a and 194b, respectively. When the lower mount component is completely slid into the base mount component 188, the securing arms decompress outward when the securing lips 186a and 186b are slid past the back securing surfaces 196*a* and 196*b*. The securing arms flexibly exert force outward such that the securing lips extend outwards and make contact with the back securing surfaces or overlap at least partially with the back securing surfaces, preventing the lower mount component from sliding backwards and securely coupling the lower mount component to the base mount component. The lower mount component can be uncoupled from the base mount component by compressing the securing arms of the lower mount component such that the width of the prong-side of the lower mount component is again reduced to less than the width between the securing arms of the base mount component, and sliding the lower mount component backwards past the base mount component.

The lower mount component 160 can include a spine groove on the bottom side of the lower mount component to allow for the reciprocal sliding and insertion of the spine 198 of the base mount component 188 into the spine groove when the lower mount component is slid onto and secured to the base mount component. The spine of the base mount component exerts a force upwards on the lower mount component, forcing the lower mount component upward such that the top securing surfaces 184*a* and 184*b* are forced upward into the top securing surfaces 194*a* and 194*b*.

The upward force of the lower mount component 160 into the top securing surfaces 194*a* and 194*b* of the securing arms 190*a* and 190*b* result in the vertical securement of the lower mount component onto the base mount component. In other words, by forcing the lower mount component upwards, the spine 198 prevents any up or down motion by the lower mount component relative to the base mount component. In addition, the upwards force exerted by the spine 198 into the lower mount component (the force exerted by the top securing surfaces 182*a* and 182*b* into the top securing surfaces 192*a* and 192*b*, respectively), in combination with the coefficient of friction between both the top securing surfaces 182*a* and 192*a* and the top securing surfaces 182*b* and 192*b*, results in a friction force between the lower mount component and the base mount component. The friction force prevents any horizontal movement of the lower mount component relative to the base mount component resulting from horizontal forces on the lower mount component less than the friction force. Thus, the spine 198 secures the lower mount component onto the base mount component by preventing both the vertical and the horizontal movement of the lower mount component relative to the base mount component.

Figure 2A:
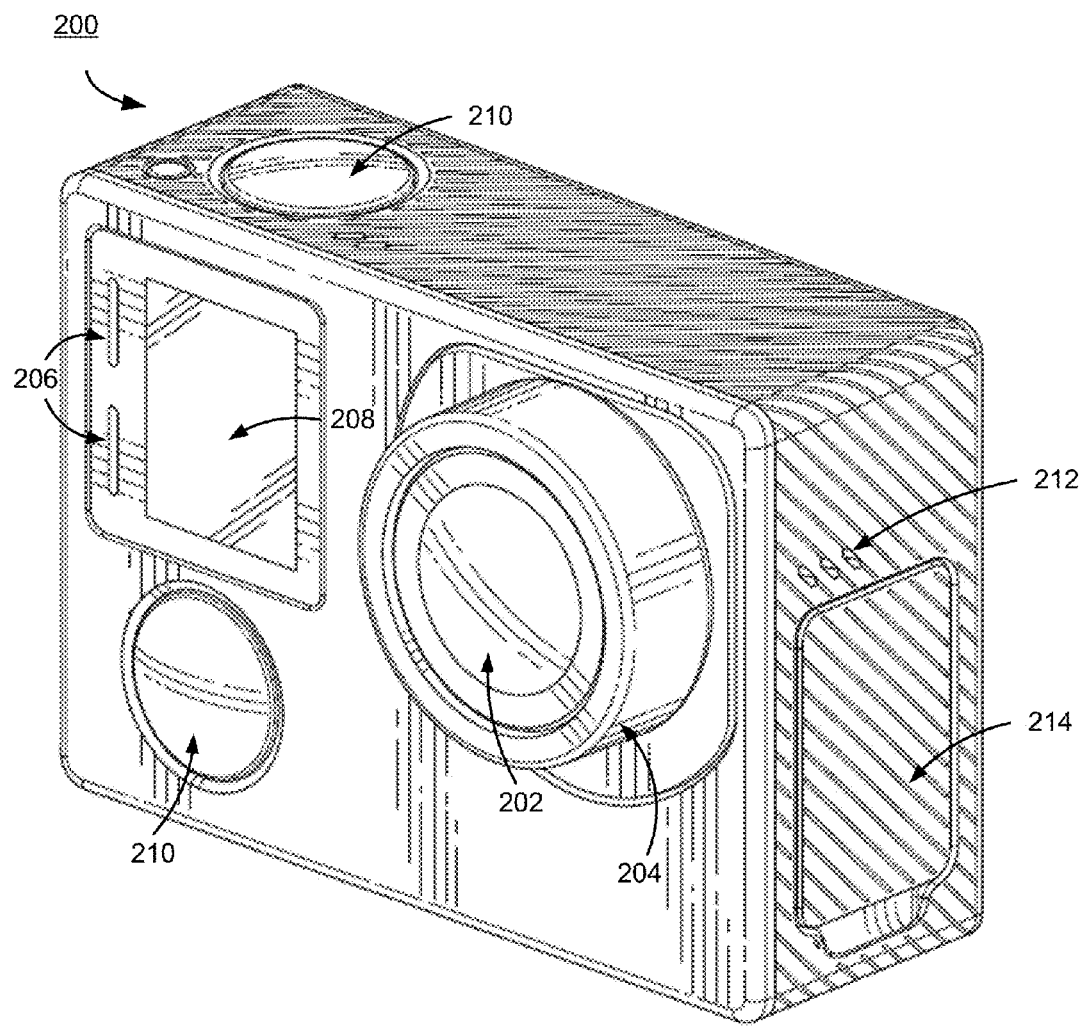
FIG. 2a illustrates a perspective view of a camera for use with the camera system, according to one embodiment.

It should be noted in alternative embodiments, the lower mount component 160 is configured to securely couple to the base mount component 188 using other means than those described with regards to FIG. 1*c*. For example, the lower mount component can include a securing protrusion on the bottom side of the lower mount component configured for insertion into a reciprocal opening within the base mount component, and secured using, for example, a securing pin or other locking mechanism. Similarly, the securing arms 190*a* and 190*b* of the base mount component can be compressible or flexible such that the arms can be squeezed apart, the lower mount component can be slid onto the base mount component, and the arms can be released, securely coupling the lower mount component to the base mount component. The lower mount component can be securely coupled to the base mount component using adhesives, buttons, ties, latches, springs, or any combination of the mechanisms described herein. Any other suitable securing mechanism can be used to secure the lower mount component to the base mount component. In addition, as will be described below in greater detail, the lower mount component, the base mount component, or both can be configured to detach such that a camera housing can decouple to the lower mount component or such that the lower mount component can decouple from a base mount component in response to a force exerted on the camera FIG. 2*a* illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens for capture by the image sensor. The lens 202 is enclosed by a lens ring 204.

The camera 200 can include various indicators, including the LED lights 206 and the LED display 208 shown in FIG. 2*a*. When the camera 200 is enclosed within the housing 100, the LED lights and the LED display 208 are configured to substantially align with the indicator window 106 and be visible through the housing 100. The camera 200 can also include buttons 210 configured to allow a user of the camera to interact with the camera, to turn the camera on, to initiate the capture of video or images, and to otherwise configure the operating mode of the camera. The camera 200 can also include one or more microphones 212 configured to receive and record audio signals in conjunction with recording video. In some embodiments, the camera 200 includes one or more sets of microphones, with each set of microphones including a first microphone and a second, dampened microphone, where the second dampened microphone is configured to capture audio at approximately 20 dB (or any other suitable magnitude) less than the first microphone. The side of the camera 200 includes an I/O interface 214. Though the embodiment of FIG. 2*a* illustrates the I/O interface 214 enclosed by a protective door, the I/O interface can include any type or number of I/O ports or mechanisms, such as USC ports, HDMI ports, memory card slots, and the like.

Figure 2B:
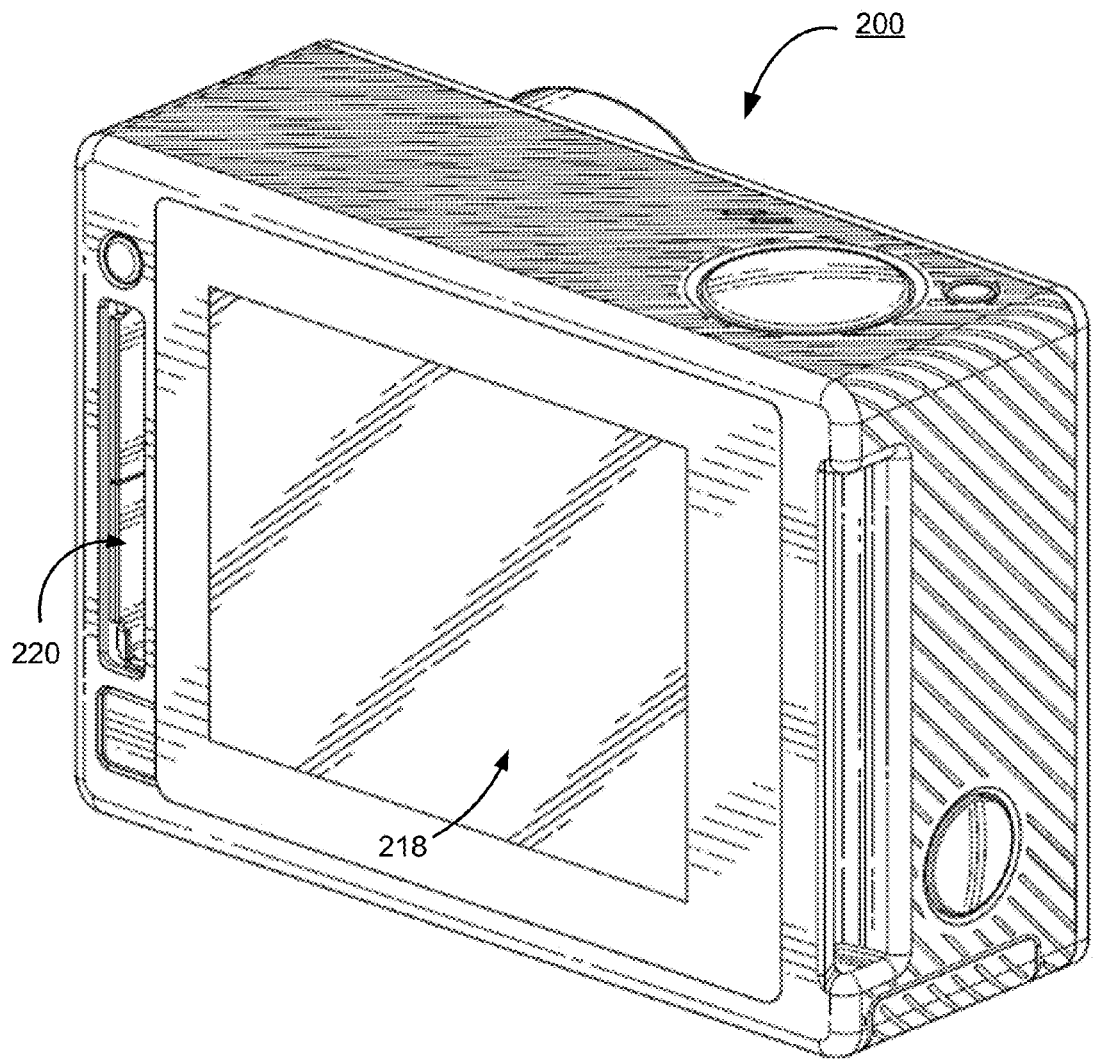
FIG. 2b illustrates a perspective view of a rear of a camera for use with the camera system, according to one embodiment.

FIG. 2*b* illustrates a perspective view of a rear of a camera 200 for use with the camera systems described herein, according to one embodiment. The camera 200 includes a display 218 (such as an LCD or LED display) on the rear surface of the camera 200. The display 218 can be configured for use, for example, as an electronic view finder, to preview captured images or videos, or to perform any other suitable function. The camera 200 also includes an expansion pack interface 220 configured to receive a removable expansion pack, such as an extra battery module, a wireless module, and the like. Removable expansion packs, when coupled to the camera 200, provide additional functionality to the camera via the expansion pack interface 220.

Example Camera Mount with Ball-And-Socket Joint

A camera mount can include a ball-and-socket joint that allows for a larger range of motion of one mount portion relative to another when compared to other camera mounts.

Figure 3A:
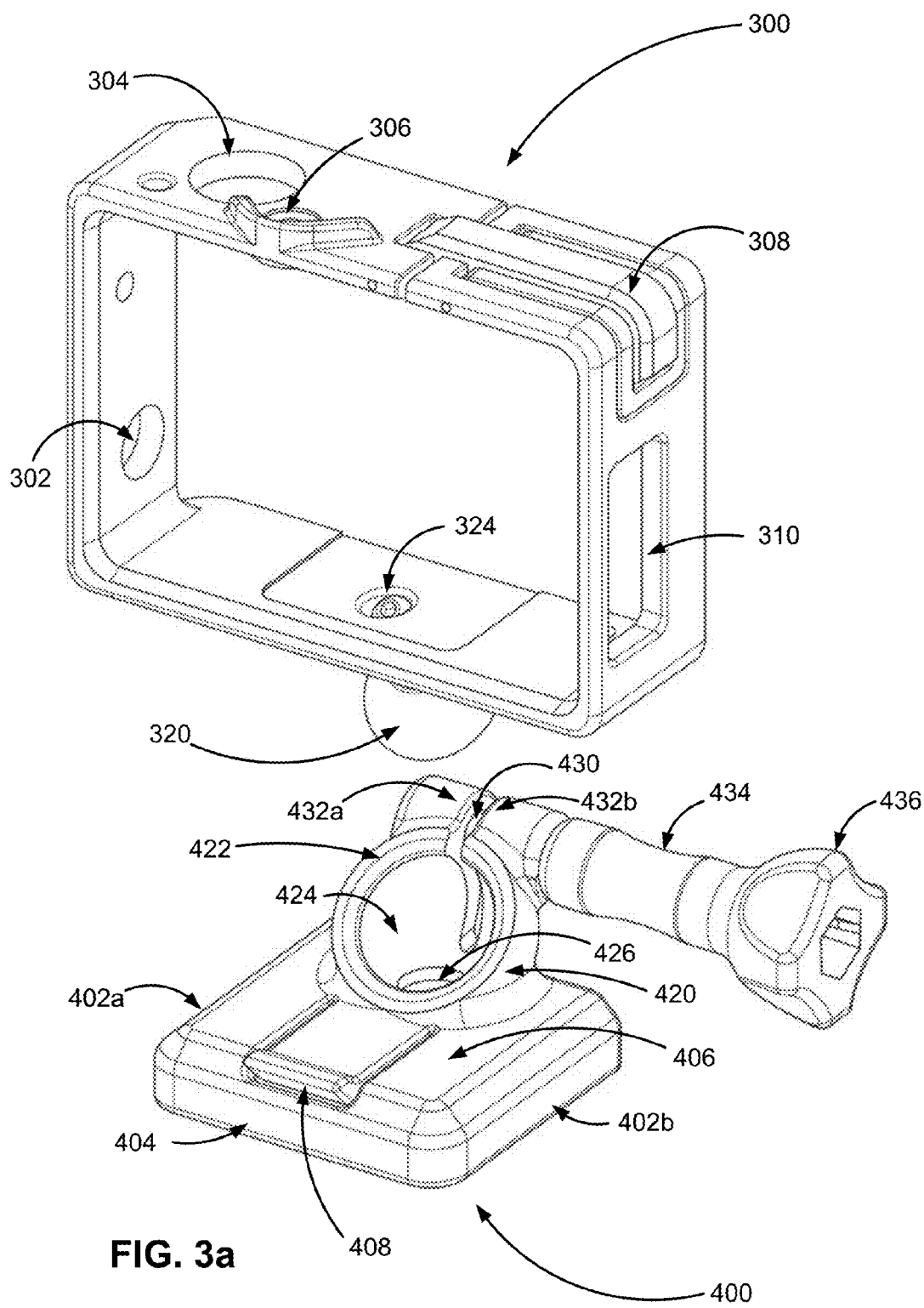
FIGS. 3a and 3b illustrate exploded views of a camera mount with a ball-and-socket joint, according to one embodiment.
Figure 3B:
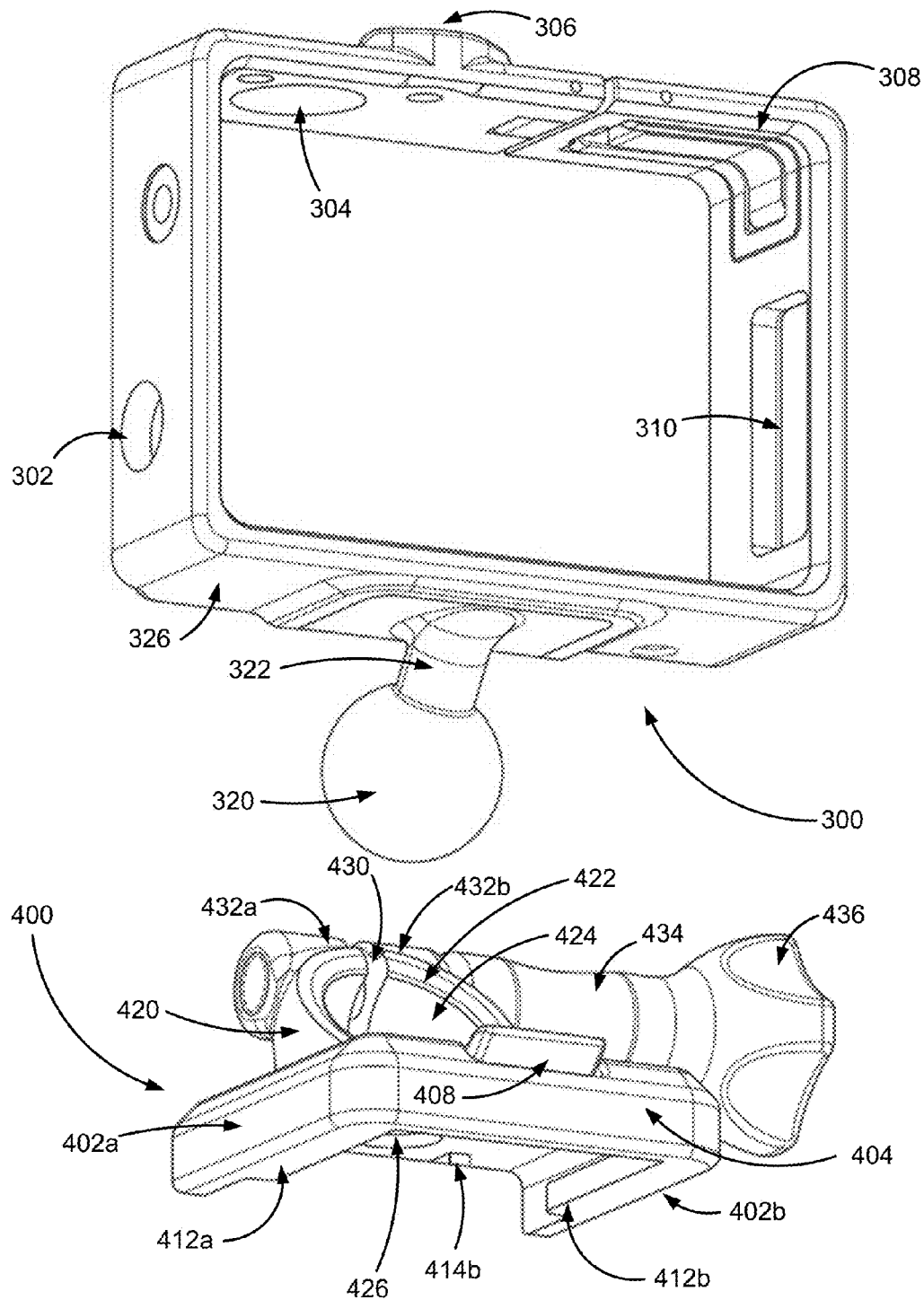
Figure 4A:
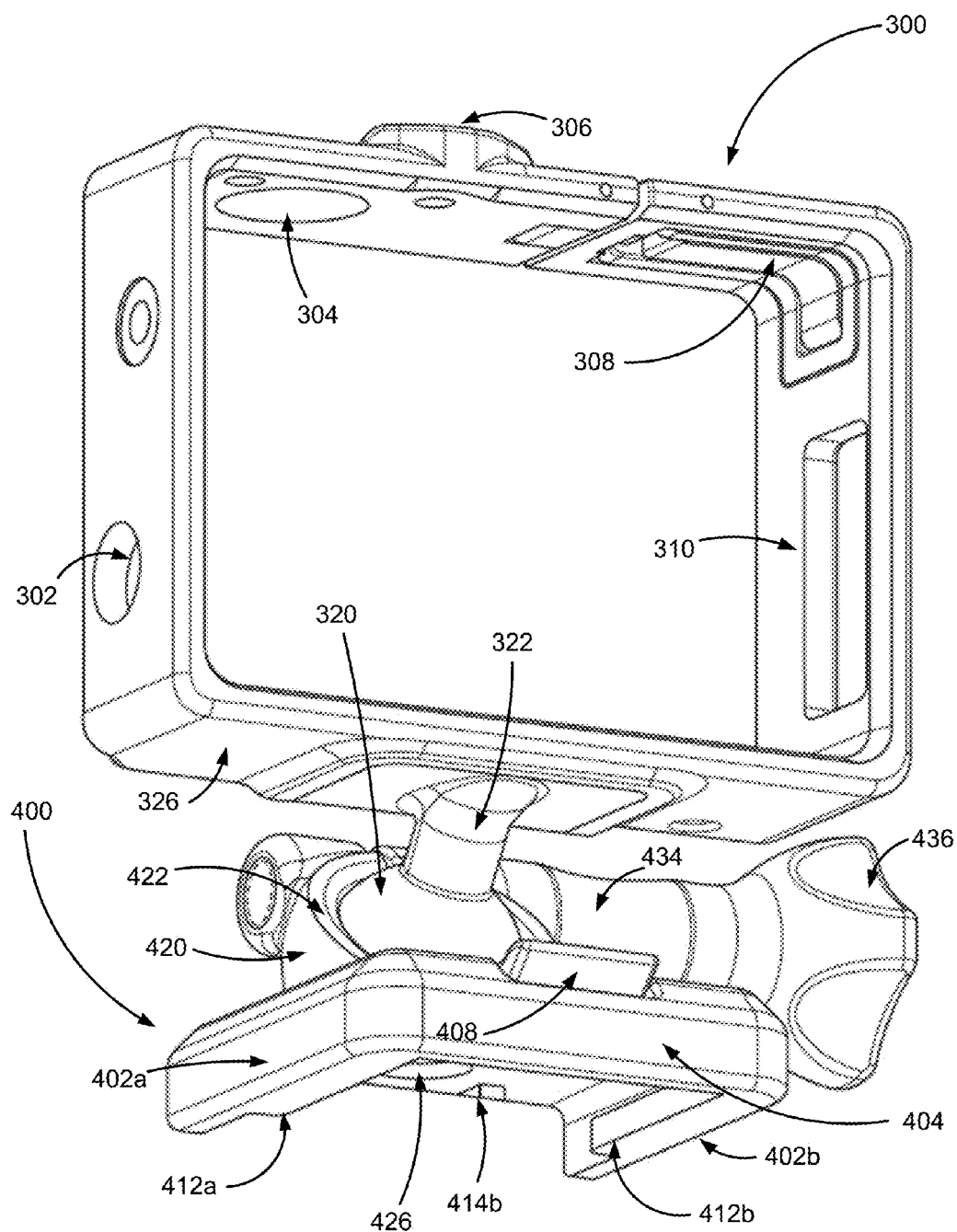
FIGS. 4a through 4e illustrate assembled views of a camera mount with a ball-and-socket joint, according to one embodiment.
Figure 4B:
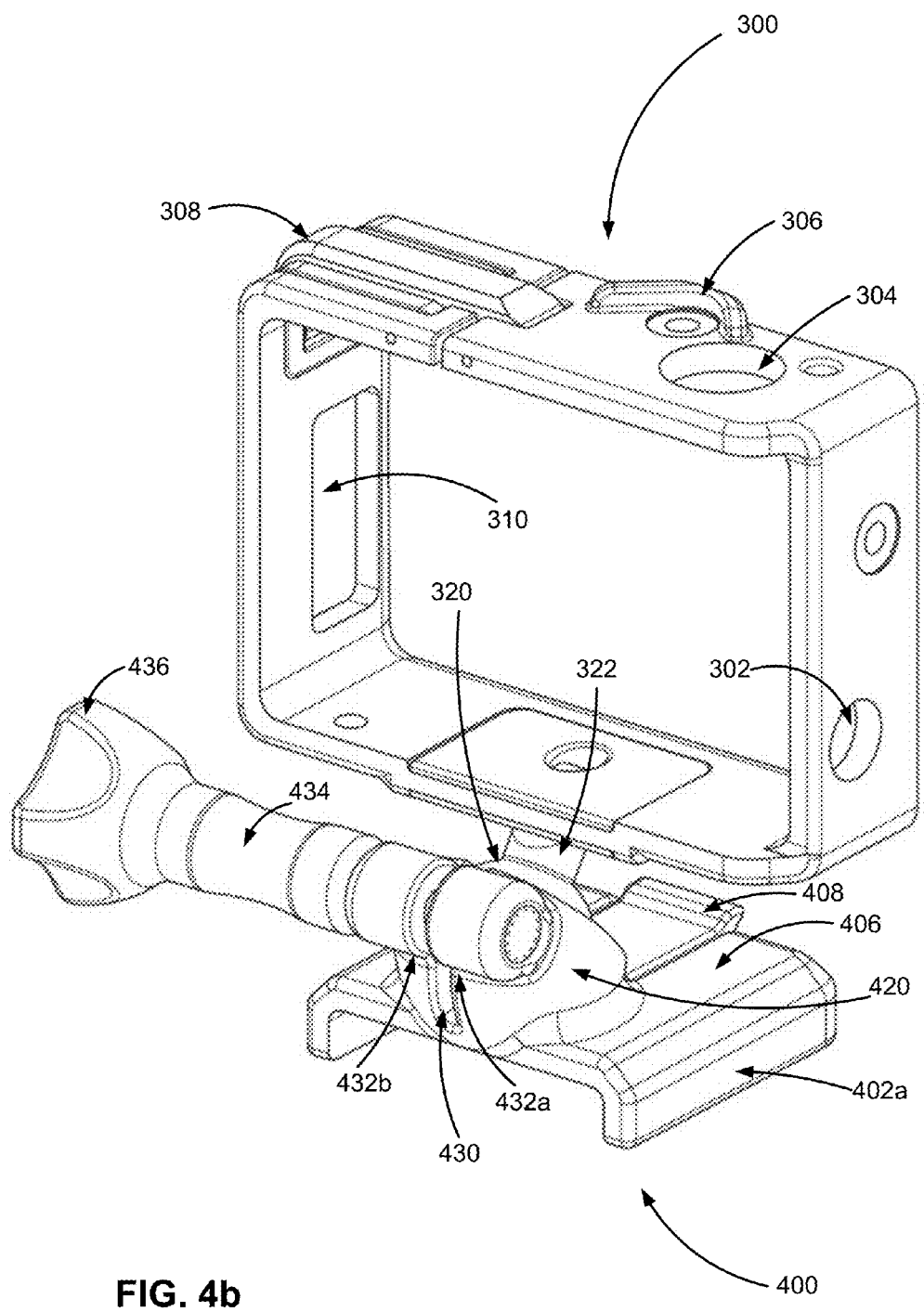
Figure 4C:
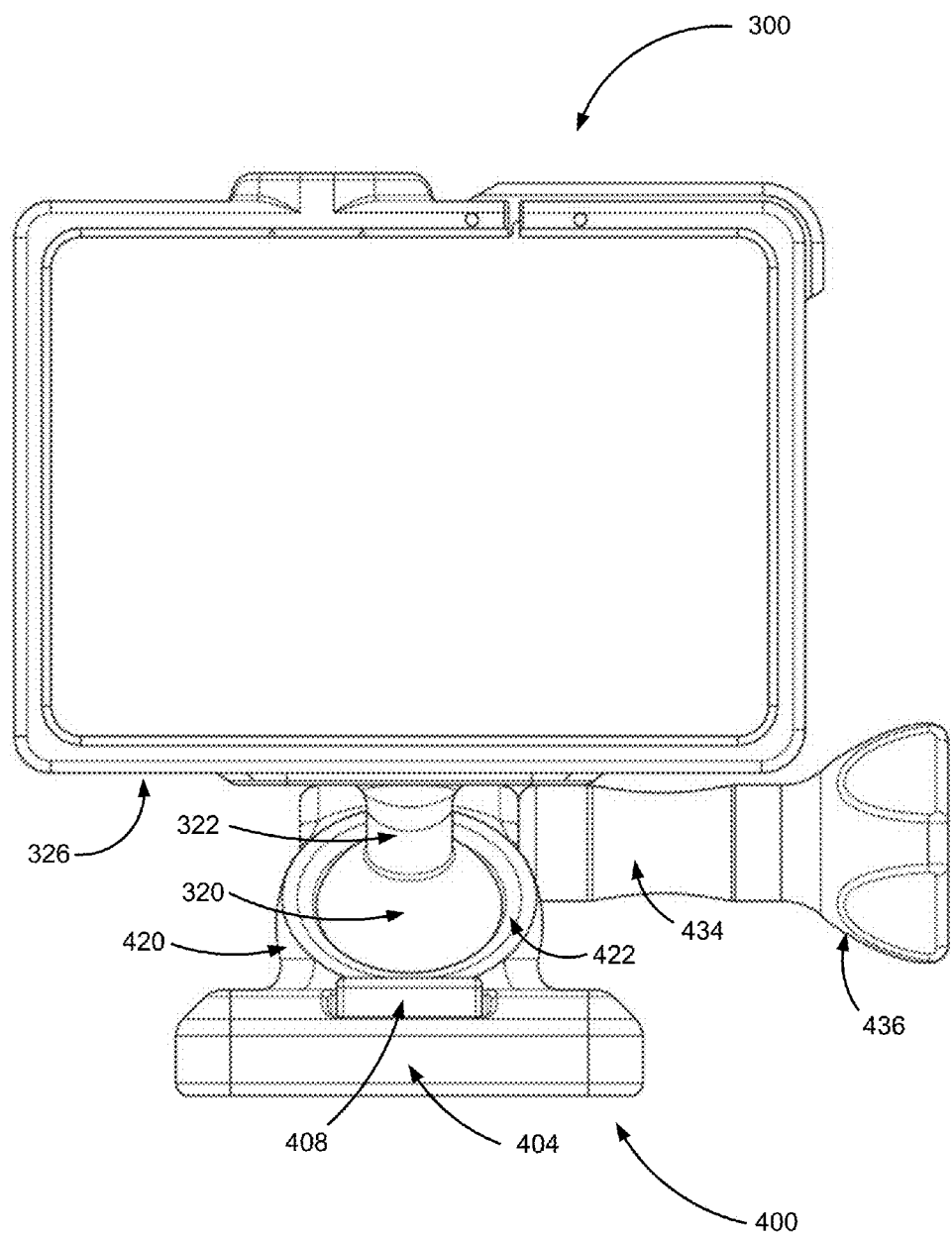
Figure 4D:
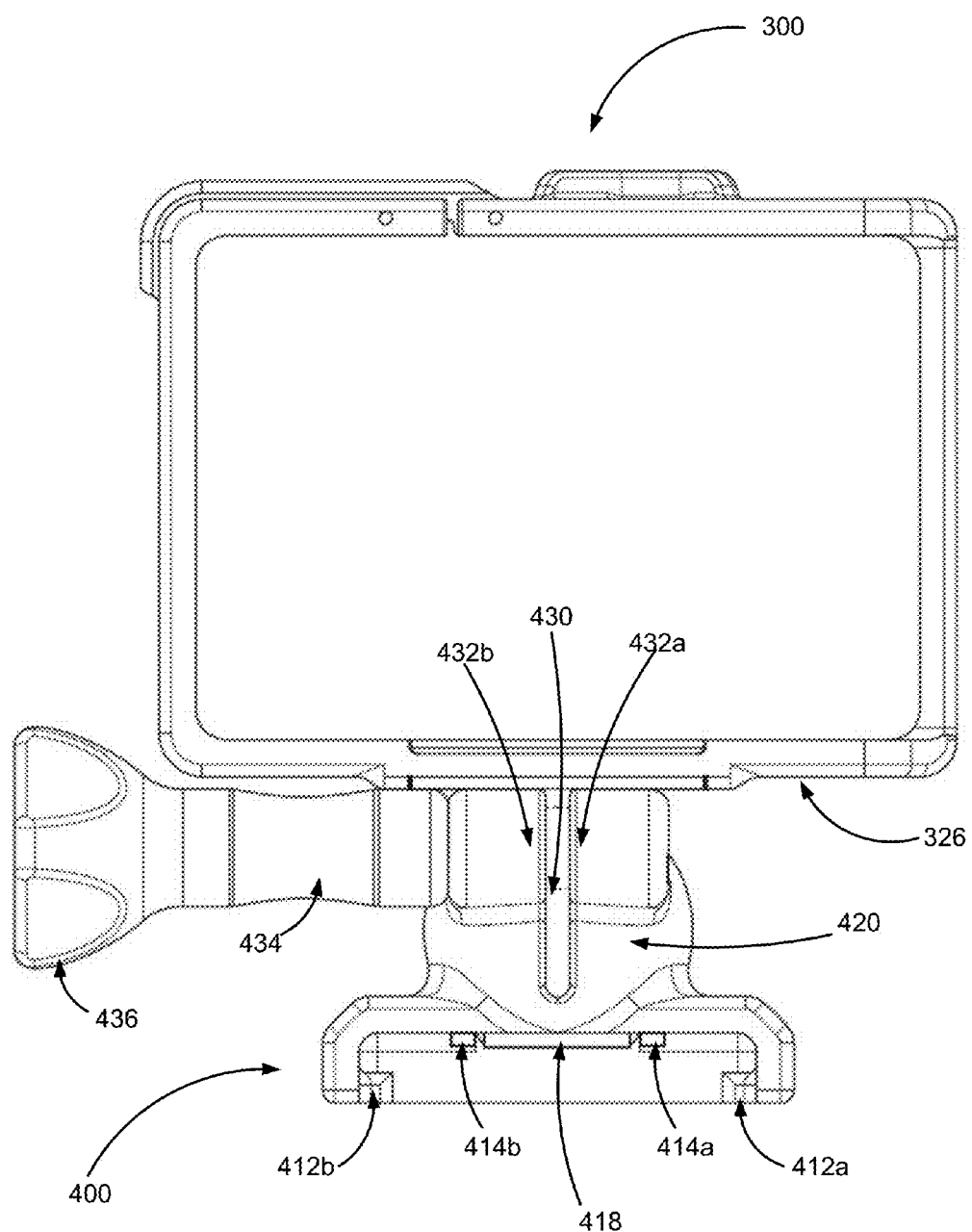
Figure 4E:
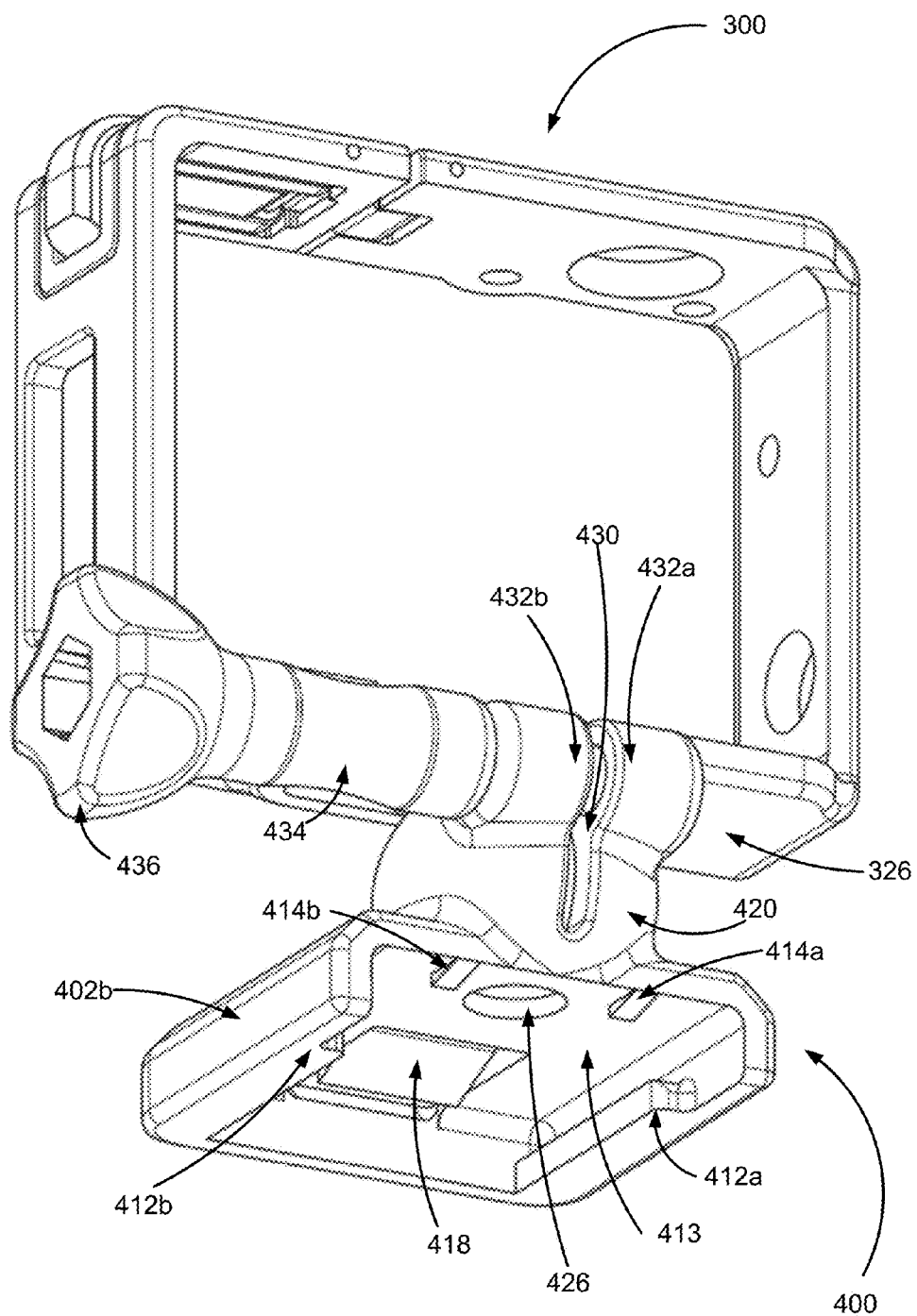

FIGS. 3*a* and 3*b* illustrate exploded views of a camera mount with a ball-and-socket joint, according to one embodiment. An upper mount component 300 is configured to partially enclose a camera 200. In some embodiments, the upper mount component has four sides: a top side, a bottom side, a right side, and a left side. In other embodiments, the upper mount component 300 has six sides and fully encloses the camera 200 (for example, similarly to the camera mount of FIGS. 1*a* and 1*b*).

The upper mount component 300 has a bottom surface 326 from which a protrusion 322 extends. The protrusion 322 includes a ball 320, and is securely or removably coupled to the bottom surface 326 of the upper mount component 300, for instance with a screw 324 or other securing mechanism. In the embodiments of FIGS. 3a and 3b, the protrusion 322 extends downward and backward relative to the bottom surface 326, though in other embodiments, the protrusion can extend straight downward or any other suitable angle relative to the bottom surface. The sides of the upper mount component 300 can include various cutouts that accommodate features, input/output mechanisms, user interaction mechanisms, or other structures of the camera 200. For example, these could include openings 302 and 310, shutter release button 304, and the like. The upper mount component 300 can also include a latch 308 configured to cause portions of the upper mount component to flex apart in an open configuration (allowing for the insertion or removal of a camera from the upper mount component), or to cause the portions of the upper mount component to securely abut in a closed configuration (allowing for the securing of a camera within the upper mount component).

In accordance with the embodiment shown in FIGS. 3a and 3b, the camera mount also includes a lower mount component 400. The lower mount component 400 has a top surface 406, on which a socket 420 is positioned. The socket 420 includes a top ring surface 422 and an inside surface 424. In some embodiments, the inside surface 424 is semi-spherical or partially spherical in shape, and can include cut-outs or holes removed from the inside surface as described herein. In some embodiments, the top ring surface 422 of the socket 420 can be positioned at an angle relative to the top surface 406 of the lower mount component 400, for instance an angle between 0 and 90 degrees. In some embodiments, the angle of the top ring surface 422 relative to the top surface 406 of the lower mount component 400 is substantially the same as or is complementary to the angle of the protrusion 322 relative to the bottom surface 326 of the upper mount component 300. For instance, the top ring surface 422 can be positioned at a 35 degree angle relative to the surface 406, and the protrusion 322 can be protrude at a 55 degree angle from the surface 326.

The ball 320 of the upper mount component is configured for insertion into the socket 420. In some embodiments, the ball 320 can be inserted into or removed from the socket 420 when the socket is configured in an open configuration, and can be secured within the socket 420 when the socket is configured in a closed configuration. In some embodiments, the coefficient of static friction between the outer surface of the ball 320 and the inside surface 424 of the socket 420 is large enough to prevent the movement of the upper mount component 300 relative to the lower mount component 400 when the socket is configured in a closed configuration. In some embodiments, the coefficient of static friction between the outer surface of the ball 320 and the inside surface 424 of the socket 420 is large enough to prevent the movement of the upper mount component 300 relative to the lower mount component 400 when the mount is exposed to wind or other small external forces, but is small enough to allow for a user to manually rotate upper mount component relative to the lower mount component, for instance by exerting force on the upper mount component. In such embodiments, the moment arm resulting from the exertion of force on the upper mount component is great enough to overcome the friction force between the ball 320 and the inside surface 424, allowing for manual movement by a user, but not from wind, water, or other forces.

In some embodiments, the upper mount component 300 can rotate 360 degrees relative to the lower mount component 400 within the horizontal plane defined by the surface 406. In such embodiments, the surface 326 remains substantially parallel to the surface 406. The upper mount component 300 can also pivot within one or more vertical planes relative to the lower mount component 400. In such embodiments, the angle between the surface 326 and the surface 406 changes. For example, the upper mount component 300 can be pivoted up to 90 degrees or more forward relative to the lower mount component 400. In one embodiment, the upper mount component 300 is pivoted forward such that a front face of the upper mount component is substantially parallel with the surface 406. Similarly, the upper mount component 300 can be pivoted up to 60 degrees or more backwards relative to the lower mount component 400. Likewise, the upper mount component 300 can be pivoted up to 60 degrees or more to the left or to the right relative to the lower mount component 400. It should be emphasized that the upper mount component can be both rotated within the horizontal plane defined by the surface 406 and pivoted within one or more vertical planes relative to the lower mount component 300. For example, the upper mount component 400 can be rotated 180 degrees horizontally such that a front face of the upper mount component faces towards a rear side of the lower mount component 300, and pivoted 90 degrees towards a front side 404 of the lower mount component, causing the front face of the upper mount component to face upwards, in a direction substantially perpendicular to the surface 406.

The ability of the upper mount component 300 to rotate and pivot relative to the lower mount component 400 beneficially allows a camera secured within the upper mount component to capture images and videos from a wide variety of perspectives. For instance, a camera within the upper mount component 300 can be adjusted to capture image and video in any combination of a 360 degree horizontal rotation and a 90 degree or more pivot towards a front side 404 of the lower mount component 400, a 60 degree or more pivot towards a rear of the lower mount component, a 60 degree or more pivot towards a left side 402b of the lower mount component, or a 60 degree or more pivot towards a right side 402a of the lower mount component. It should be noted that as used herein, the "front" or "front side" of the lower mount component 400 refers to the side of the lower mount component towards which the top ring surface 422 is angled, and the "rear" or "rear side" of the lower mount component refers to the side of the lower mount component away from which the top ring surface is angled.

In various embodiments, the inside surface 424 includes a hole 426 at the bottom of the inside surface to accommodate the curvature of the ball 320 when the ball 320 is inserted within the socket 420, beneficially allowing the upper mount component 300 to rotate and pivot within the socket 420 without requiring a deeper socket.

The socket 420 can include a split 430, which extends from the top ring surface 422 down through a portion of the inside surface 424 (for instance, through 40% or more of the inside surface 424). On either side of the split 430 and extending outward from the top ring surface 422 are screwhole protrusions 432a and 432b. The screwhole protrusions 432 align such that a screw 434 with a handle 436 can be inserted through the screwhole protrusions. When the handle 436 is rotated in a tightening direction, the screw 434 tightens and causes the screwhole protrusions 432a and 432b to flexibly compress towards each other, lessening the width of the split 430. This, in turn, decreases the surface area of the inner surface 424 of the socket 420. When the ball 320 is inserted into the socket 420, the decreased surface area of the inner surface 424 increases the radially inward normal force applied by the inner surface 424 on the ball 320, increasing the friction force exerted on the ball, and securing the ball within the socket. Such a configuration is referred to herein as the "closed configuration". As described above, in the closed configuration, the upper mount component 300 cannot rotate or pivot relative to the lower mount component 400 without manual force exerted upon the upper mount component by a user. FIGS. 4a-e illustrate assembled views of the mount with the ball-and-socket joint as described herein. It should be noted that the socket 420 encompasses 50% or more of the surface of the ball 320 when the ball is secured within the socket. In the closed configuration, as the width of the split 430 is decreased, the circumference of the top ring surface 422 can be decreased to less than the circumference of the ball 320. As the ball is at least 50% encompassed by the socket 420, such a configuration prevents the ball 320 from being removed from the socket 420.

When the handle 436 is rotated in a loosening direction, the screw 434 loosens, causing the screwhole protrusions to separate, and increasing the width of the split 430. This, in turn, increases the surface area of the inner surface 424 of the socket 420, decreasing the friction force exerted upon the ball 320 by the inner surface, allowing the upper mount component 300 to be rotated or pivoted relative to the lower mount component 400 more easily. Such a configuration is referred to herein as the "open configuration". In the open configuration, as the width of the split 430 is increased, the circumference of the top ring surface 422 can be increased to greater than the circumference of the ball 320, allowing for the insertion of the ball into or removal of the ball from the socket 420.

Figure 5:
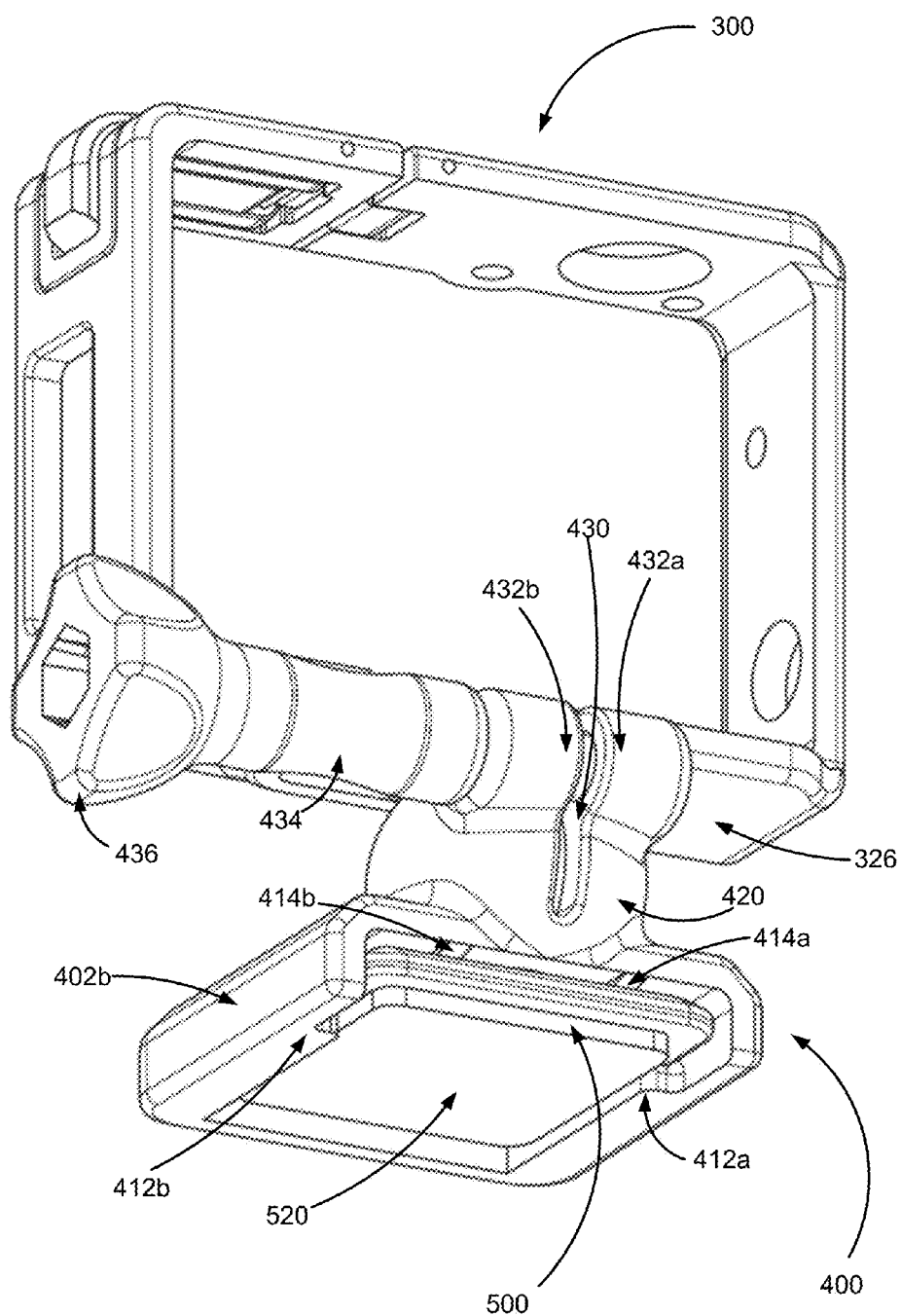
FIG. 5 illustrates a camera mount with a ball-and-socket joint and a mount base, according to one embodiment.

The lower mount component 400 couples to a base mount component 500, as shown in FIG. 5. A bottom side of the lower mount component 400 can include ledges 412a and 412b protruding inward from a bottom of the sides 402 of the lower mount component, creating a space between a top side of the ledges 412 and a bottom surface 413 of the lower mount component. The base mount component 500 can be inserted into the space between the ledges 412 and the bottom surface 413. The bottom surface 413 includes lips 414a and 414b protruding downward from the bottom surface. The lips 414 can be triangular in shape such that a first face protrudes diagonally downward from the bottom surface 413 and facing outward from the lower mount component 400, and such that a second face protrudes perpendicularly downward from the bottom surface. As described below, the lips 414 are configured to catch on and secure the base mount component 500.

The top surface 406 of the lower mount component 400 includes a tab 408 with a lip 418 configured to exert downward force on the base mount component 500 in a released configuration when the base mount component is inserted into the lower mount component, causing the base mount component to exert reciprocal force on a top surface of the ledges 412. The lip 418 is configured to catch and abut a reciprocal ledge on a top surface of the base mount component 500 when the tab 408 is in the released configuration, securing the base mount component to the lower mount component 400. The tab 408 can be lifted by a user in a lifted configuration such that the lip 418 does not exert downward force on the base mount component 500, allowing for the removal of the base mount component from the lower mount component 400.

Figure 6A:
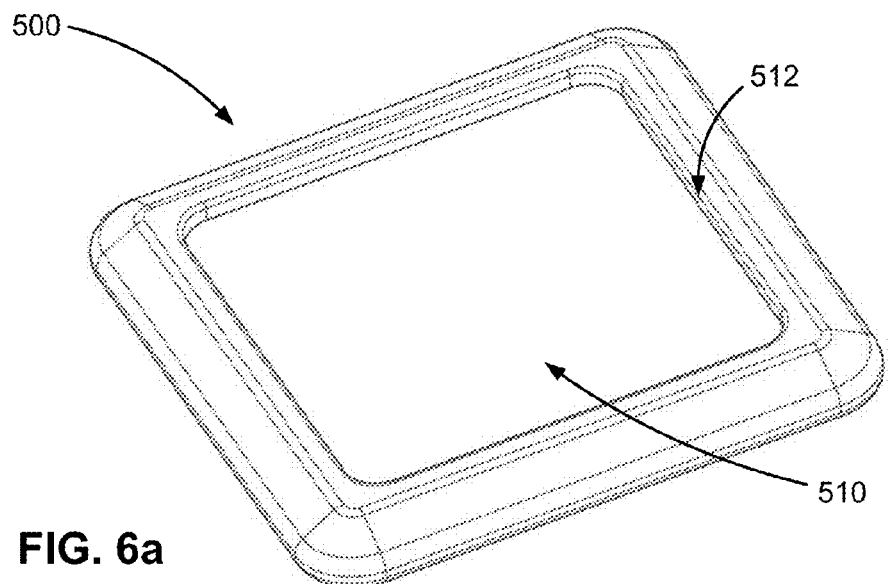
FIGS. 6a through 6c illustrate views of a camera mount base, according to one embodiment.
Figure 6B:
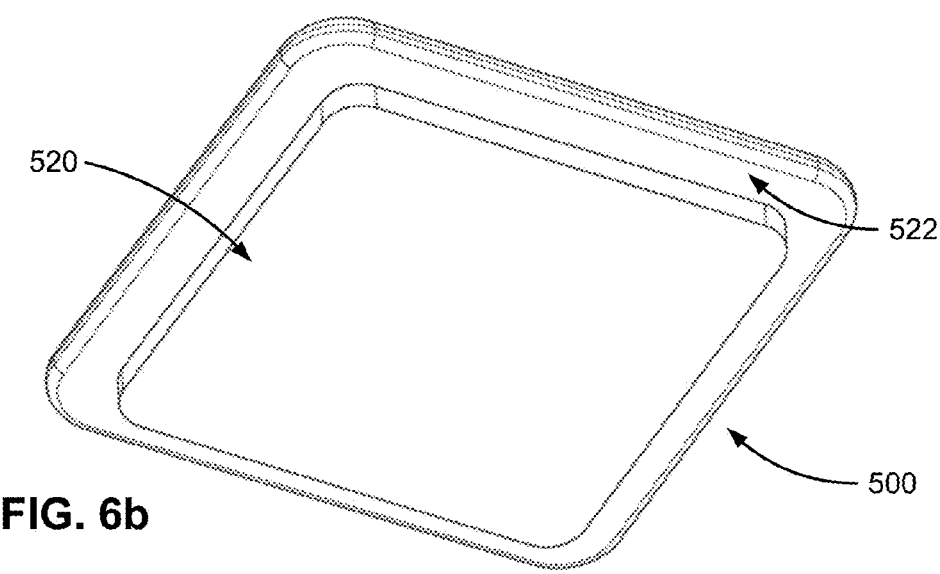
Figure 6C:
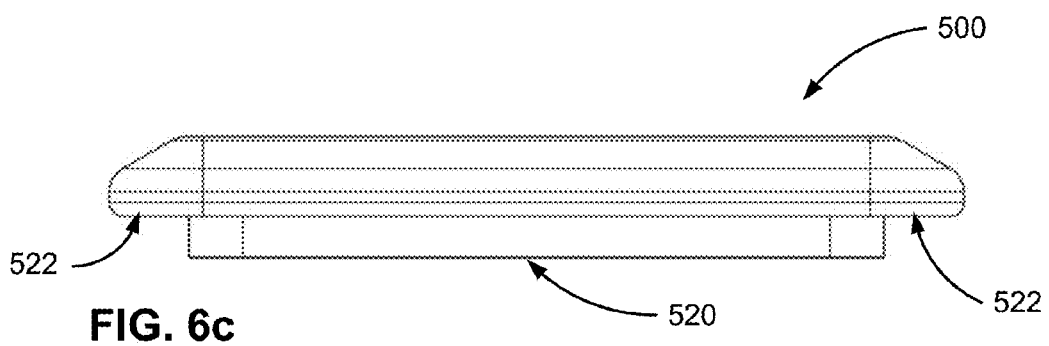

The base mount component 500 is illustrated from various perspectives in FIGS. 6a-c. The base mount component 500 has a top surface 510 and a bottom surface 520. The top surface 510 has a ridge 512 around its perimeter, extending perpendicularly upward from the top surface and diagonally upward from the outside perimeter of the ridge. When the base mount component 500 is completely inserted into the lower mount component 400, the ridge 512 catches and abuts the lip 418, securing the base mount component within the lower mount component. Similarly, the lips 414a and 414b of the lower mount component 400 exert a downward force onto the ridge 512 of the base mount component 500 when the base mount component is inserted into the lower mount component, further securing the base mount component within the lower mount component. The bottom surface 520 of the base mount component 500 protrudes downward and outward from the ledge 522. The ledge 522 can abut the top sides of the ledges 412 when the base mount component is inserted into the lower mount component 400.

The bottom surface 520 can be coupled to a surface to secure the base mount component in place. For instance, the bottom surface can be coupled to a surface adhesively, mechanically, with suction, with an attachment device (such as a screw), or using any other suitable mechanism or means. In some embodiments, the bottom surface 520 can be removably or temporarily coupled to a surface, allowing a user to remove the base mount component 500 from a surface and to re-couple the base mount component to another surface. The base mount component 500 can couple to any suitable surface, such as a sports board, a wall, a ledge, a vehicle, a user, and the like.

The base mount component 500 is substantially square in shape, such that base mount component is symmetric across the width and height of the base mount component. Such a configuration beneficially allows for the insertion of the base mount component 500 into the lower mount component 400 in any of four directions, allowing a user to position the lower mount component such that the lower mount component is facing any of the four directions. It should be noted that although reference is made herein to the insertion and removal of the base mount component 500 into/from the lower mount component 400, generally the base mount component will be secured to a surface, and the lower mount component will be inserted over/removed from the base mount component. When the upper mount component is securely coupled to the lower mount component 400, and the coupled mount components are secured onto the base mount component, a user can capture images and video with a camera secured within the upper mount component, at any of a number of angles and orientations as described herein. When the user wishes the remove the coupled mount components from the base mount component 500, the user can simply lift upwards on the tab 408 and slide the coupled mount components off of the base mount component.

Backwards Compatibility

To make the ball-and-socket joint system compatible with previous camera mounting systems (such as the mounting systems illustrated in FIGS. 1a, 1b, and 1c), adapters 700, 800, and 1000 shown in FIGS. 7, 8, and 10 have been created. Both adapters 700 and 800 couple to the upper mount 300 in the way described above but include an alternative mechanism for coupling with a base mount that is different from base mount 500.

Figure 7A:
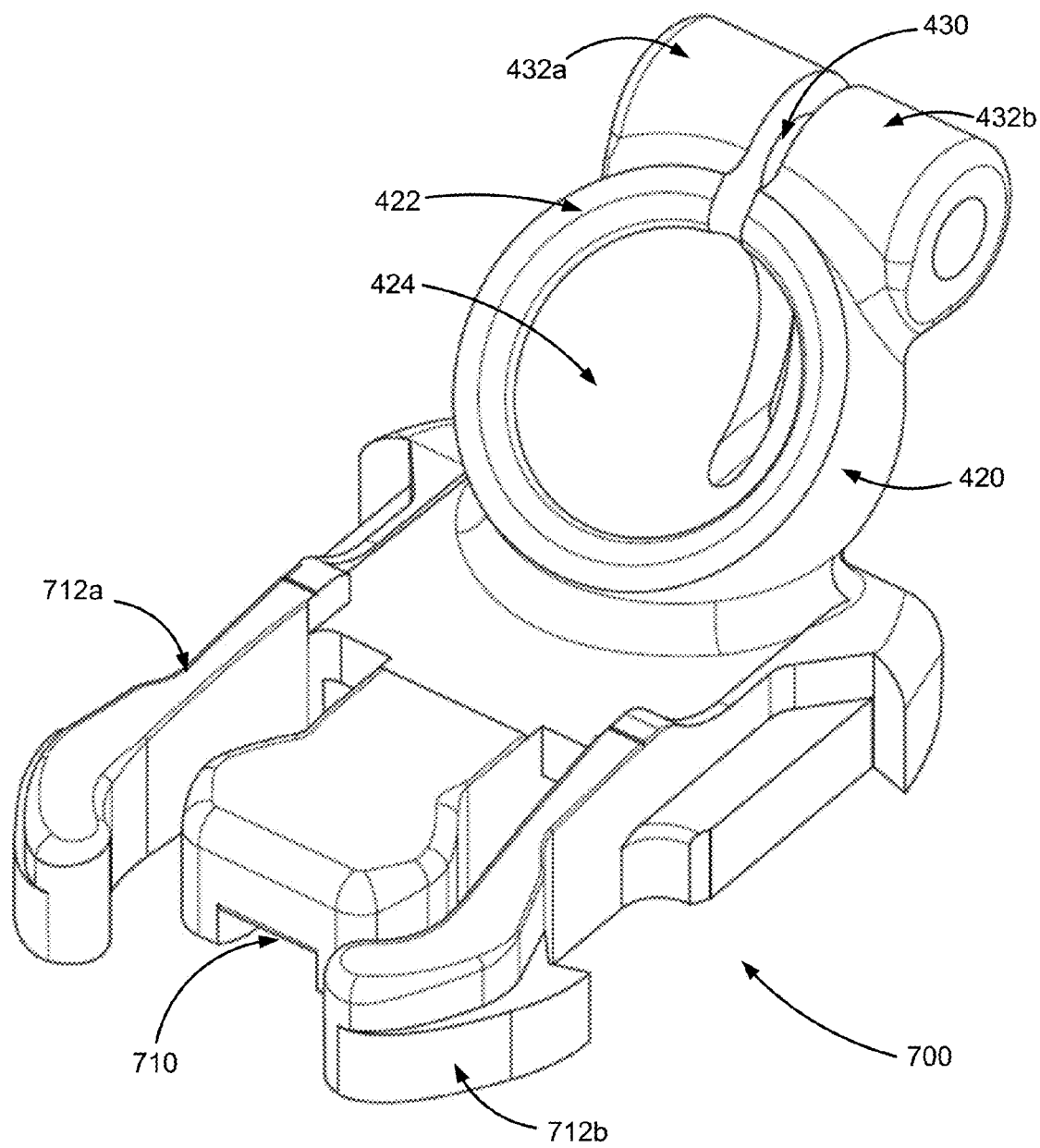
FIGS. 7a and 7b illustrate views of an adapter for a camera mount with a ball-and-socket joint, according to one embodiment.
Figure 7B:
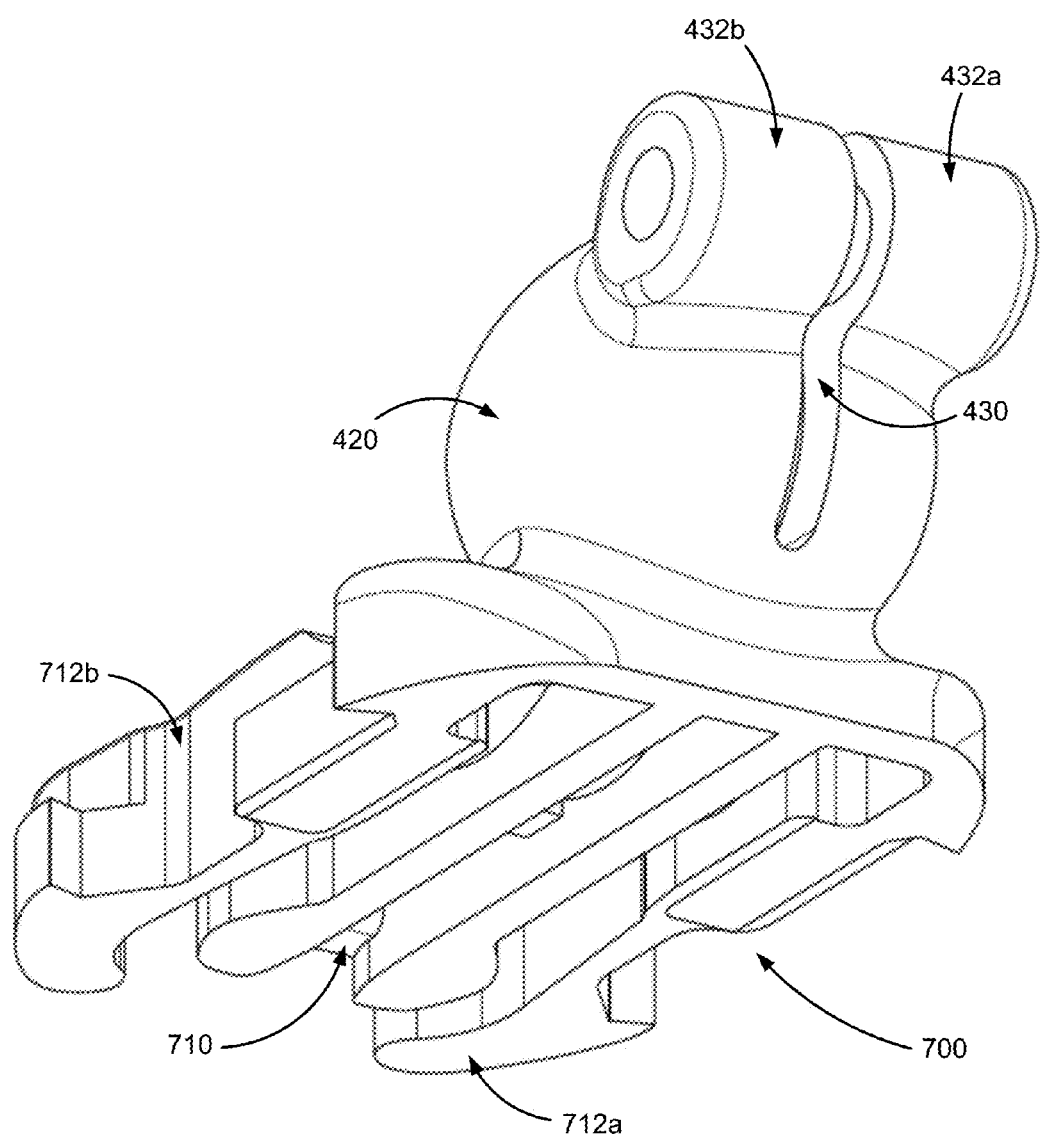

FIGS. 7a and 7b illustrate views of an adapter for a camera mount with a ball-and-socket joint, according to one embodiment. The adapter 700 of FIGS. 7a and 7b includes a socket 420 with a top ring surface 422 and a semi-spherical inside surface 424, similar to the socket of, for instance, FIG. 3a described above and enabling the adapter 700 to couple to a reciprocal ball component. Similarly, the adapter 700 of FIGS. 7a and 7b include a split 430 with screwhole protrusions 432a and 432b, similar to the socket of, for instance, FIG. 3a described above. Likewise, the adapter 700 includes a base that includes a groove 710 and prongs 712a and 712b.

The prongs 712a and 712b are similar to the prongs 180a and 180b of FIG. 1c, and enable the adapter 700 to couple to, for example, the base mount component 188 of FIG. 1c. The groove 710 is configured to accommodate, for example, the spine 198 of the base mount component 188 of FIG. 1c.

By including the socket 420, the adapter 700 can beneficially couple to both the base mount component 188 of FIG. 1c and the ball component of, for example, the upper mount component 300 of FIG. 3a. Such embodiments allow a ball and socket mounting system, such as that described in conjunction with FIGS. 3-5, to be backwards compatible with existing mounting systems couple using flexible prongs (such as prongs 180a and 180b) and securing arms (such as securing arms 190a and 190b), such as those described in conjunction with FIG. 1c.

Figure 8A:
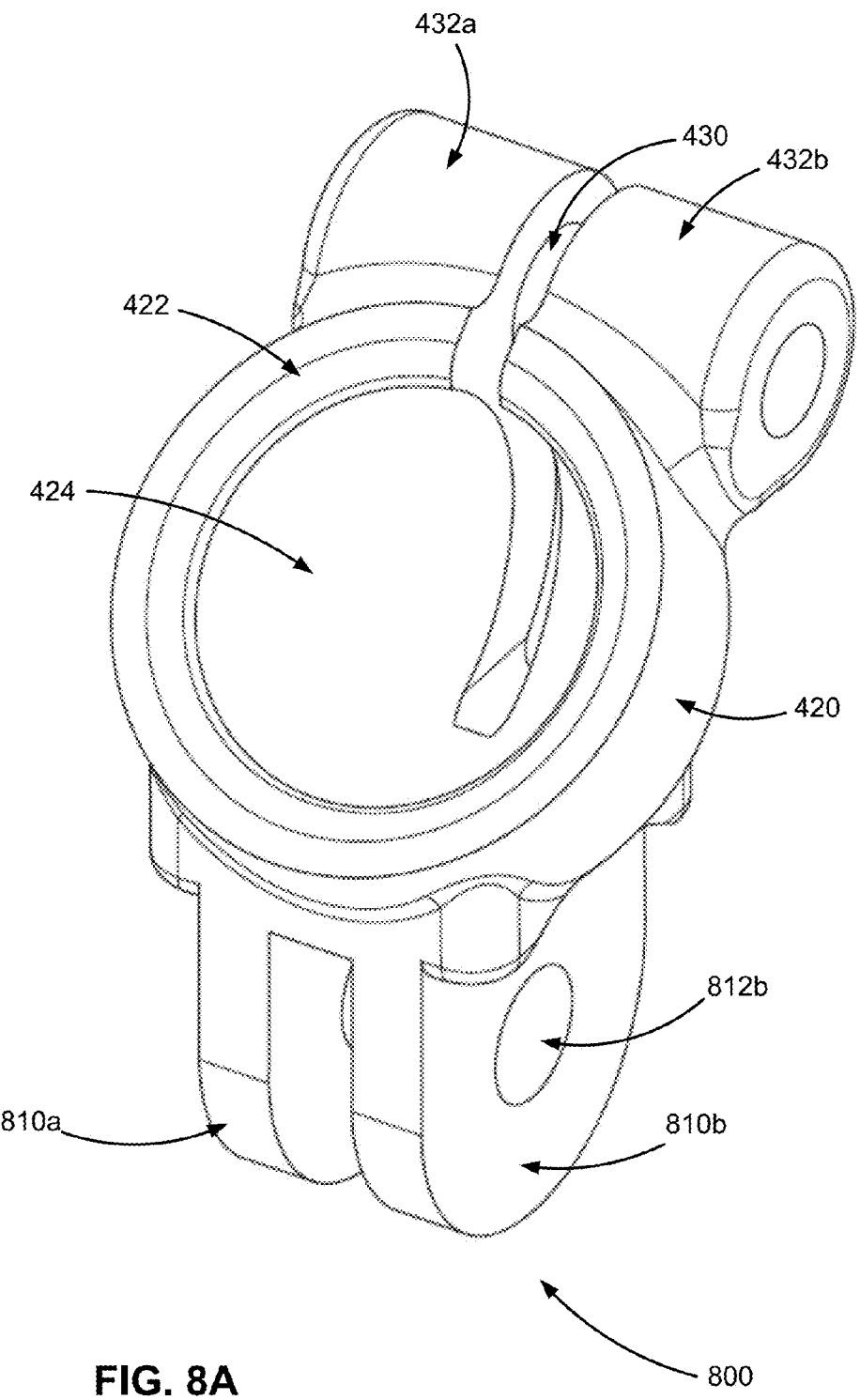
FIGS. 8a and 8b illustrate views of an adapter for a camera mount with a ball-and-socket joint, according to another embodiment.
Figure 8B:
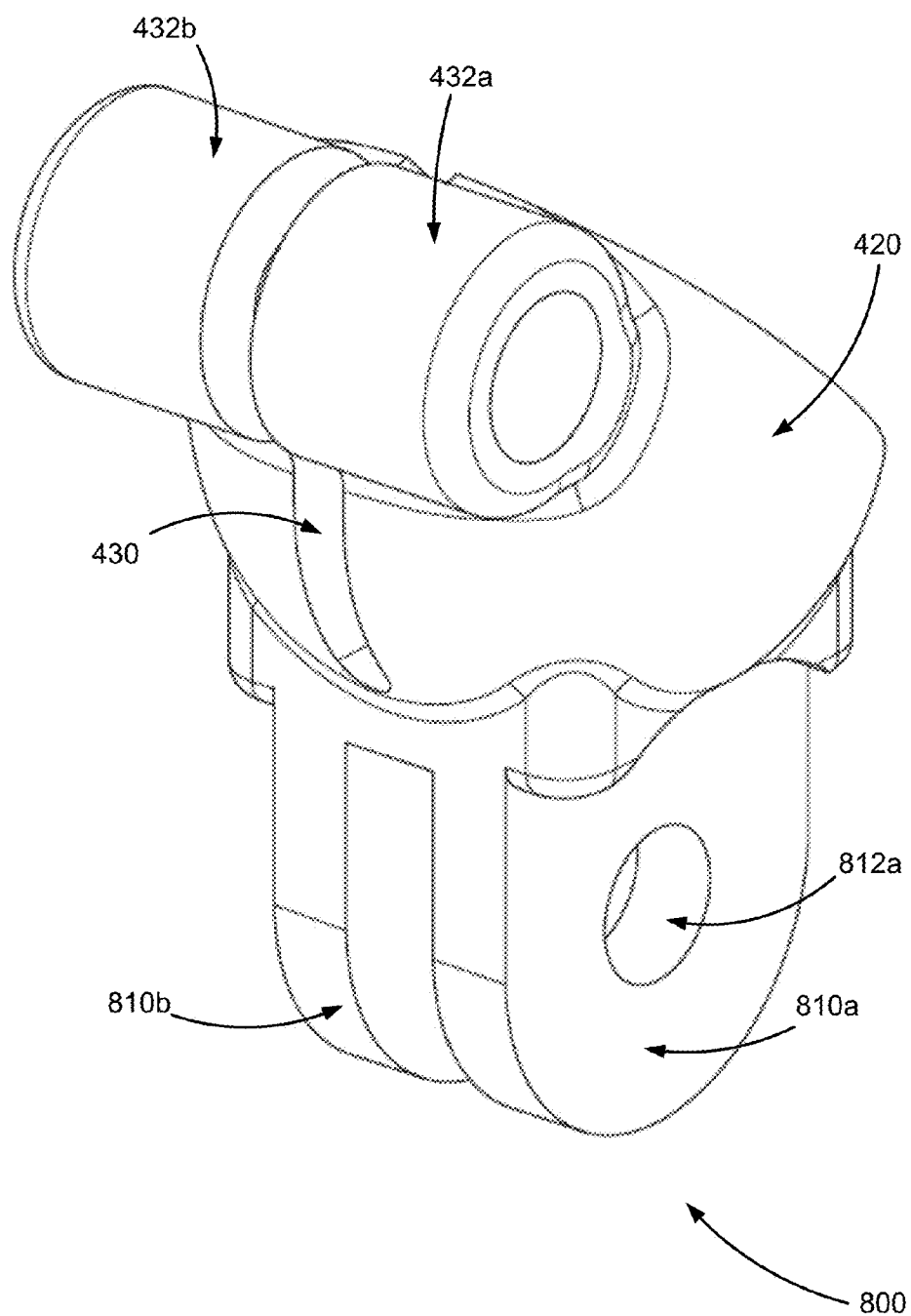

FIGS. 8a and 8b illustrate views of an adapter for a camera mount with a ball-and-socket joint, according to another embodiment. As with the adapter 700 of FIG. 7, the adapter 800 of FIG. 8 includes a socket 420 with a top ring surface 422 and a semi-spherical inside surface 424, a split 430, and screwhole protrusions 432a and 432b, for instance similar to the embodiment of FIG. 3a. The adapter 800 of FIG. 8 further includes a plurality of protrusions 810a and 810b, each with a corresponding hole 812a and 812b. In some embodiments, the plurality of protrusions 810a and 810b are similar to the plurality of protrusions 120 of FIG. 1a.

The adapter 800 of FIG. 8 can beneficially couple to both a reciprocal ball component, such as the ball component 300 of FIG. 3a, and a reciprocal plurality of protrusions, such as the protrusions 170 of the lower mount component 160 of FIG. 1c. Such embodiments allow a ball and socket mounting system, such as that described in conjunction with FIGS. 3-5, to be backwards compatible with existing mounting systems that pivotally couple using interlocking sets of protrusions and hinge joints, such as those described in conjunction with FIG. 1.

FIGS. 10a, 10b, and 10c illustrate views of an adapter for a camera mount with a ball-and-socket joint, according to one embodiment. The adapter 1000 of FIGS. 10a-10c includes a ball component 320 configured to securely and/or rotationally couple to a reciprocal socket component. In some embodiments, the ball component 320 is similar to the ball component 320 of FIG. 3. The adapter further includes a plurality of protrusions 1005, each with a hole 1010. In some embodiments, the plurality of protrusions 1005 is similar to the plurality of protrusions 170 of the embodiment of FIG. 1c.

In some embodiments, the adapter 1000 includes a top surface from which the plurality of protrusions 1005 protrude. It should be noted that although two protrusions are depicted in the embodiment of FIG. 10, in other embodiments, three or more protrusions can protrude from the top surface of the adapter 1000, while in yet other embodiments, only one protrusion protrudes from the top surface. In the embodiment of FIG. 10, each protrusion 1005 includes an inside surface, and each inside protrusion surface is parallel. In embodiments with three or more protrusions, each protrusion includes at least one surface parallel to a surface of another protrusion. In embodiments with one protrusion, the protrusion includes two surfaces on opposite sides of the protrusion, the two surfaces being parallel to each other.

In some embodiments, the adapter 1000 includes a bottom surface from which the ball component 320 protrudes. The ball component 320 can be spherical or semi-spherical. In some embodiments, the ball component 320 protrudes directly from the bottom surface of the adapter 1000. In other embodiments, the ball component 320 is coupled to the bottom surface of the adapter 1000 by a neck component. In such embodiments, the diameter of the ball component 320 is greater than the diameter of the neck component. In the embodiment of FIG. 10, the ball component 320 protrudes from the bottom surface of the adapter, and the plurality of protrusions 1005 protrude from the top surface of the adapter at an angle relative to the ball component, such that the angle defined by a first axis through a center of the ball component and a second axis through a center of a protrusion is less than 180 degrees. It should be noted that in other embodiments, the first axis and the second axis are the same axis, such that the protrusions 1005 do not protrude from the top surface of the adapter at an angle relative to the ball component.

The adapter 1000 of FIG. 10 can beneficially couple to both a reciprocal socket component, such as the socket component 420 of FIG. 3a, and a reciprocal plurality of protrusions, such as the protrusions 120 of FIG. 1a. Such embodiments allow a ball and socket mounting system, such as that described in conjunction with FIGS. 3-5, to be backwards compatible with existing mounting systems that pivotally couple using interlocking sets of protrusions and hinge joints, such as those described in conjunction with FIG. 1.

Extension Arm Example

Figure 9A:
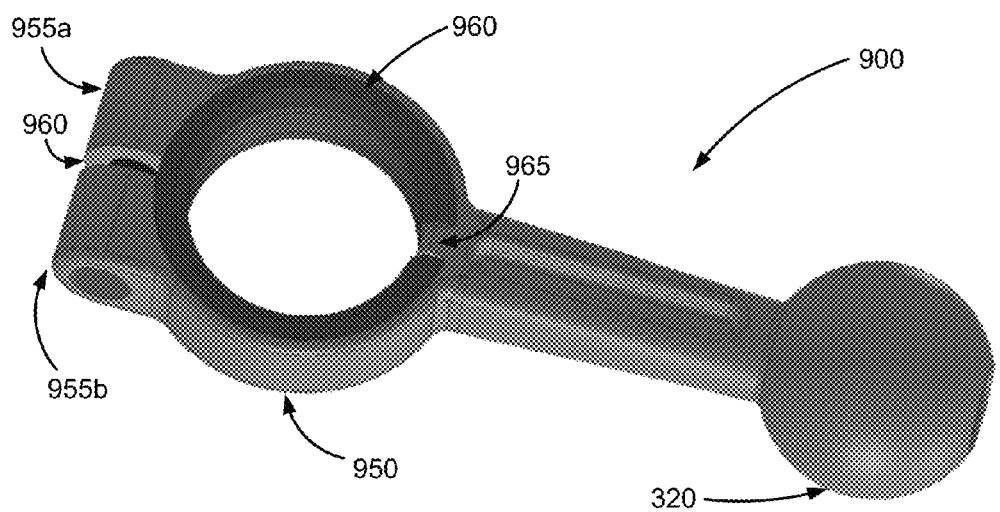
FIGS. 9a and 9b illustrate views of an extension arm for a camera mount with a ball-and-socket joint, according to one embodiment.
Figure 9B:
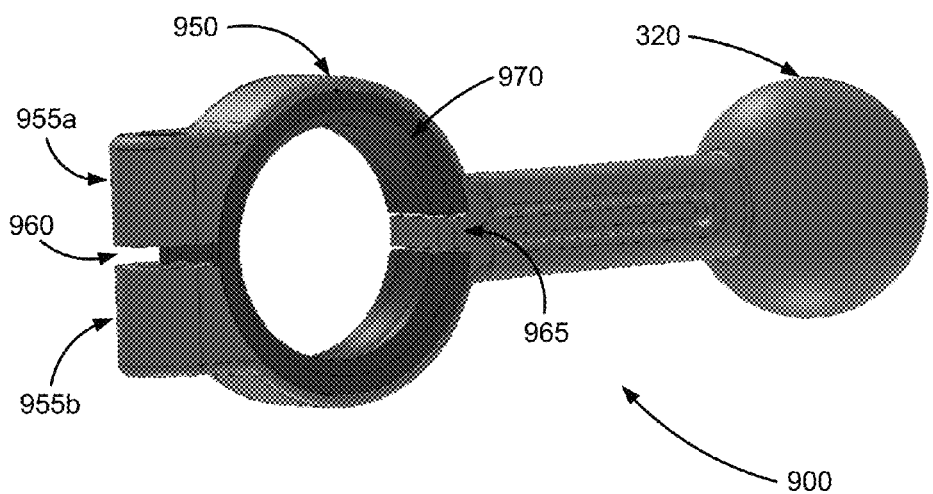

FIG. 9 illustrates an extension arm 900 that can be used to further extend the range of the camera mount system described herein. The extension arm 900 includes a ball protrusion 320 that couples to the lower mount component 400 as described above with regards to the ball 320 of FIGS. 3-5, and includes a modified socket 950 that couples to the upper mount component 300. The modified socket 950 is configured to securely enclose around a circumference of the ball 320, as well as a portion on either side of the enclosed circumference of the ball 320. The modified socket 950 includes a split 960. On either side of the split 960 are screwhole protrusions 955a and 955b that align such that a screw can be inserted through the screwhole protrusions. The screw can then be tightened to flexibly compress the screwhole protrusions 955a and 955b towards each other and lessen the width of the split 960, decreasing the circumference of the inner surface of the modified socket 950 and increasing the radially inward normal force exerted on the ball 320 by the modified socket 950, securing the ball 320 within the modified socket 950. In one embodiment, a socket ring 960 including a semi-spherical profile is included within the modified socket 950 in order to better match the contours of the ball 320. The socket ring 960 can also include a split 965 that decreases in width when a screw is inserted and tightened, causing the screwhole protrusions 955a and 955b flexibly compress towards each other. In another embodiment, the inner surface of the modified socket 950 includes a semi-spherical profile to match the contours of the ball 320.

Camera Mounting Ecosystem

FIG. 11 illustrates a camera mount ecosystem, according to one embodiment. The ecosystem of FIG. 11 includes the camera housing 100 of FIGS. 1a and 1b, the lower mount component 160 and the base mount component 188 of FIG. 1c, the upper mount component 300 and the lower mount component 400 of FIGS. 3-5, the adapter 700 of FIGS. 7a and 7b, the adapter 800 of FIGS. 8a and 8b, the extension arm 900 of FIGS. 9a and 9b, and the adapter 1000 of FIGS. 10a-10c. Each of the components of FIG. 11 interlocks according to various configurations, enabling ball-and-socket components to couple to protrusion-based components as described herein and below.

The upper mount component 300, as described above, is configured to securely enclose a camera. Further, the upper mount component 300 is configured to couple, via a ball component of the upper mount component, to a reciprocal socket component of any of the lower mount component 400, the adapter 700, or the adapter 800. As described above, the ball component of the upper mount component 300 can rotationally couple to a reciprocal socket component, enabling the upper mount component to fixedly rotate relative to any of the lower mount component 400, the adapter 700, or the adapter 800, thus enabling a camera secured by the upper mount component to both couple and rotate relative to these components. In some embodiments, where the lower mount component 400 is secured to an object, user, vehicle, or surface, a camera secured by the upper mount component 300 can in turn by coupled to the object, user, vehicle, or surface if the upper mount component 300 is coupled to the lower mount component 400, or if the upper mount component 300 is coupled to the extension arm 900, which is coupled to the lower mount component 400.

In some embodiments, the upper mount component 300 optionally couples to the extension arm 900. As described above, the ball component of the upper mount component 300 can rotationally couple to the modified socket of the extension arm 900. The ball component of the extension arm 900 can in turn rotationally couple to any of the lower mount component 400, the adapter 700, or the adapter 800. Such embodiments beneficially enable a camera secured by the upper mount component 300 to be rotationally secured to any of the lower mount component 400, the adapter 700, or the adapter 800, but at an extension distance based on the length of the extension arm 900.

The adapter 700 can securely couple to the base mount component 188, as described above. Similarly, the adapter 800 can securely couple to the lower mount component 160, which in turn can couple to the base mount component 188. In such embodiments, a camera secured by the upper mount component 300 can be coupled to the base mount component 188, and in turn can be coupled to any object, user, vehicle, or surface to which the base mount component is coupled. For example, a camera can be secured by the upper mount component 300, which can be coupled to the extension arm 900, which in turn can be coupled to the adapter 700, which can be coupled to the base mount component 188. Likewise, a camera can be secured by the upper mount component 300 coupled to the adapter 800, which is coupled to the lower mount component 160, which is coupled to the base mount component 188.

In some embodiments, the camera housing 100 can couple to the adapter 1000 or the lower mount component 160. For instance, the plurality of protrusions of the camera housing 100 can interlock and pivotally couple to a reciprocal plurality of protrusions of the adapter 1000 or the lower mount component 160, for example using a turnable handscrew. As noted above, the lower mount component 160 can couple to the base mount component 188, thereby coupling the camera housing 100 (and any camera secured by the housing) to the base mount component 188, and by proxy to any object, user, vehicle, or surface to which the base mount component is coupled. The adapter 1000 can couple to the lower mount component 400, thereby coupling the camera housing 100 (and any camera secured by the housing) to the lower mount component 400 and to any object, user, vehicle, or surface to which the lower mount component is coupled.

The adapter 1000 can also couple to the adapters 700 and 800, which in turn can couple to the lower mount component 160 and/or the base mount component 188. Accordingly, the camera housing 100 can couple to the adapter 1000, which can couple to the adapter 800, which can couple to the lower mount component 160, which can couple to the base mount component 188. Such embodiments enable the camera housing 100 to pivotally rotate relative to the adapter 1000, which can in turn rotate relative to the lower mount component 400, or the adapters 700 r 800. Although not shown in the ecosystem of FIG. 11, the ball component of the adapter 1000 can couple to the modified socket of the extension arm 900, which in turn can couple to lower mount component 400, the adapter 700, or the adapter 800 as described above.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera mount as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A mounting system for attaching a camera to a surface, comprising:
   an upper mount component structured to at least partially enclose a camera, the upper mount component having a bottom surface including a first plurality of protrusions extending from the bottom surface, each protrusion comprising a hole;
   an adapter comprising a second plurality of protrusions and a ball component coupled to the second plurality of protrusions by a neck component having a smaller diameter than the ball component, the second plurality of protrusions extending from the neck component at a fixed angle such that the angle between the second plurality of protrusions and the neck component is less than 180 degrees, the second plurality of protrusions each including a hole and configured to interlock with the first plurality of protrusions such that the holes of the first plurality of protrusions interlock with the holes of the second plurality of protrusions;

a lower mount component having a top surface and a bottom surface, the top surface comprising a reciprocal socket component configured to rotationally couple with the ball component of the adapter, the socket component set at an angle relative to the top surface and having a split within an inside surface of the socket component from a top side of the socket component, the socket component comprising a screw hole protrusion on an outer surface of the socket component on either side of the split, the screw hole protrusions configured to align and receive a screw such that when a screw is inserted into the screw hole protrusions, portions of the socket component on either side of the split flexibly compress together such that the ball component is secured within the socket component, the bottom surface comprising a coupling mechanism configured to couple the lower mount component to an object or surface; and a hinge component configured for insertion into the aligned set of holes of the first plurality of protrusions and the second plurality of protrusions, pivotally coupling the upper mount component to the adapter.

2. The mounting system of claim 1, wherein the split in the socket component of the lower mount component extends no more than halfway down a side of the socket component.

3. The mounting system of claim 1, wherein the socket component of the lower mount component covers more than 50% of the surface area of the ball component of the upper mount component.

4. The mounting system of claim 1, wherein the coupling mechanism comprises an adhesive.

5. The mounting system of claim 1, wherein the hinge component comprises a turnable handscrew.

6. The mounting system of claim 1, wherein the upper mount component can pivotally rotate in two dimensions relative to the adapter, and wherein the lower mount component can rotate in three dimensions relative to the adapter.

7. A mounting system for attaching a camera to a surface, comprising:

an adapter comprising a plurality of protrusions and a ball component coupled to the plurality of protrusions by a neck component having a smaller diameter than the ball component, the plurality of protrusions extending from the neck component at a fixed angle such that the angle between the plurality of protrusions and the neck component is less than 180 degrees, the plurality of protrusions configured to interlock with and pivotally couple to a reciprocal plurality of protrusions of a camera housing configured to secure a camera; and a lower mount component having a top surface and a bottom surface, the top surface comprising a reciprocal socket component configured to rotationally couple with the ball component of the adapter, the socket component set at an angle relative to the top surface and having a split within an inside surface of the socket component from a top side of the socket component, the socket component comprising a screw hole protrusion on an outer surface of the socket component on either side of the split, the screw hole protrusions configured to align and receive a screw such that when a screw is inserted into the screw hole protrusions, portions of the socket component on either side of the split flexibly compress together such that the ball component is secured within the socket component, the bottom surface comprising a coupling mechanism configured to couple the lower mount component to an object or surface.

8. The mounting system of claim 7, wherein the split in the socket component of the lower mount component extends no more than halfway down a side of the socket component.

9. The mounting system of claim 7, wherein the socket component of the lower mount component covers more than 50% of the surface area of the ball component of the adapter.

10. The mounting system of claim 7, wherein the coupling mechanism comprises one of: an adhesive, a latch mechanism, and a buckle mechanism.

11. The mounting system of claim 7, wherein the adapter pivotally couples to the camera housing using a hinge component.

12. The mounting system of claim 7, wherein the camera housing can pivotally rotate in two dimensions relative to the adapter, and wherein the lower mount component can rotate in three dimensions relative to the adapter.

13. A mounting system for attaching a camera to a surface, comprising:

an adapter comprising a plurality of protrusions and a ball component coupled to the plurality of protrusions by a neck component having a smaller diameter than the ball component, the plurality of protrusions extending from the neck component at a fixed angle such that the angle between the plurality of protrusions and the neck component is less than 180 degrees, the plurality of protrusions configured to interlock with and pivotally couple to a reciprocal plurality of protrusions of a camera housing configured to secure a camera; and a lower mount component having a top surface and a bottom surface, the top surface comprising a reciprocal socket component configured to rotationally couple with the ball component of the adapter, the bottom surface comprising a coupling mechanism configured to couple the lower mount component to an object or surface.

14. The mounting system of claim 13, wherein the coupling mechanism comprises one of: an adhesive, a latch mechanism, and a buckle mechanism.

15. The mounting system of claim 13, wherein the adapter pivotally couples to the camera housing using a hinge component.

16. The mounting system of claim 13, wherein the camera housing can pivotally rotate in two dimensions relative to the adapter, and wherein the lower mount component can rotate in three dimensions relative to the adapter.

17. A mounting system adapter for attaching a camera to a surface, comprising a plurality of protrusions and a ball component coupled to the plurality of protrusions by a neck component having a smaller diameter than the ball component, the plurality of protrusions extending from the neck component at a fixed angle such that the angle between the second plurality of protrusions and the neck component is less than 180 degrees, the plurality of protrusions configured to interlock with and pivotally couple to a reciprocal plurality of protrusions of a camera housing configured to secure a camera, the ball component configured to rotationally couple to a reciprocal socket component of lower mount component, the lower mount component configured to couple to an object or surface, the reciprocal socket component configured to secure the ball component in a secured configuration and to allow for the insertion of the ball component into or the removal of the ball component from the reciprocal socket component in an unsecured configuration.

18. The mounting system of claim 17, wherein the plurality of protrusions protrude from a top surface of the adapter, and wherein the ball component protrudes from a bottom surface of the adapter substantially opposite the top surface.

19. The mounting system of claim 17, wherein each of the plurality of protrusions comprises a hole configured to align with a reciprocal set of holes of the reciprocal plurality of protrusions when the plurality of protrusions and the reciprocal plurality of protrusions interlock.

20. The mounting system of claim 17, wherein the reciprocal socket component can be configured into one of the secured configuration and the unsecured configuration using a screw component.

* * * * *